US008806375B2

(12) United States Patent
Tomita et al.

(10) Patent No.: US 8,806,375 B2
(45) Date of Patent: Aug. 12, 2014

(54) IMAGE PROCESSING APPARATUS, DISPLAY CONTROL METHOD THEREFOR, AND RECORDING MEDIUM

(75) Inventors: Atsushi Tomita, Toyohashi (JP); Kenichi Sawada, Toyohashi (JP); Takeshi Hibino, Toyokawa (JP); Takuya Okada, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 216 days.

(21) Appl. No.: 13/048,619

(22) Filed: Mar. 15, 2011

(65) Prior Publication Data

US 2011/0231800 A1 Sep. 22, 2011

(30) Foreign Application Priority Data

Mar. 16, 2010 (JP) ................................. 2010-060007

(51) Int. Cl.
*G06F 3/048* (2013.01)
(52) U.S. Cl.
USPC .......................................... 715/835; 715/764
(58) Field of Classification Search
USPC .......................................... 715/764–765, 835
See application file for complete search history.

(56) References Cited

U.S. PATENT DOCUMENTS

| | | | | |
|---|---|---|---|---|
| 5,497,455 A | * | 3/1996 | Suga et al. | 715/835 |
| 6,054,988 A | * | 4/2000 | Alimpich et al. | 715/769 |
| 6,978,095 B2 | * | 12/2005 | Kato | 399/81 |
| 7,827,220 B2 | * | 11/2010 | Saito | 358/1.16 |
| 7,890,879 B2 | * | 2/2011 | Nakamura et al. | 715/764 |
| 7,924,444 B2 | * | 4/2011 | Takahashi | 358/1.13 |

(Continued)

FOREIGN PATENT DOCUMENTS

| | | |
|---|---|---|
| JP | 2001-014255 A | 1/2001 |
| JP | 2004-110354 A | 4/2004 |

(Continued)

OTHER PUBLICATIONS

Office Action (Notification of Reasons for Refusal) dated Jan. 10, 2012, issued in the corresponding Japanese Patent Application No. 2010-060007, and an English Translation thereof.

(Continued)

*Primary Examiner* — William Titcomb
(74) *Attorney, Agent, or Firm* — Buchanan Ingersoll & Rooney PC

(57) ABSTRACT

An image processing apparatus includes: a display portion that is capable of: displaying in an icon display area, icons that correspond to function buttons for calling out setting screens for setting functions installed on the image processing apparatus, being organized in groups by function attribute; and displaying in a function button display area, function buttons that correspond to some of the icons, which exist at a position that a user points to; a position identification portion that identifies the position that a user points to in the icon display area; and a display controller that makes the display portion display: the icons in the icon display area; the function buttons that correspond to the icons existing at the position identified by the position identification portion, in the function button display area; and state information indicating the current state of at least one of the functions and/or attribute information indicating the current attribute of at least one of the functions, on/near a function button of the function and/or on/near an icon corresponding to this function button.

19 Claims, 19 Drawing Sheets

(56) References Cited

U.S. PATENT DOCUMENTS

| | | | |
|---|---|---|---|
| 8,006,198 B2* | 8/2011 | Okuma et al. | 715/810 |
| 8,207,986 B2* | 6/2012 | Nakamura et al. | 345/619 |
| 2004/0205169 A1 | 10/2004 | Machida | |
| 2004/0228645 A1* | 11/2004 | Kato | 399/81 |
| 2006/0020900 A1 | 1/2006 | Kumagai et al. | |
| 2006/0092453 A1* | 5/2006 | Okada et al. | 358/1.14 |
| 2006/0274347 A1 | 12/2006 | Mori | |
| 2007/0247643 A1* | 10/2007 | Nakamura et al. | 358/1.1 |
| 2007/0250785 A1 | 10/2007 | Nakamura et al. | |
| 2008/0216005 A1* | 9/2008 | Bamba et al. | 715/765 |
| 2008/0229247 A1* | 9/2008 | Bamba | 715/835 |
| 2009/0046057 A1* | 2/2009 | Umezawa | 345/156 |
| 2010/0011318 A1 | 1/2010 | Nakada et al. | |
| 2010/0153506 A1* | 6/2010 | Lim | 709/206 |
| 2010/0205566 A1* | 8/2010 | Matoba | 715/838 |
| 2011/0249283 A1* | 10/2011 | Okada et al. | 358/1.9 |
| 2011/0265037 A1* | 10/2011 | Okuma et al. | 715/810 |

FOREIGN PATENT DOCUMENTS

| | | |
|---|---|---|
| JP | 2006-031560 A | 2/2006 |
| JP | 2006-243952 A | 9/2006 |
| JP | 2006-323504 A | 11/2006 |
| JP | 2009-266192 A | 11/2009 |
| JP | 2010-021947 A | 1/2010 |

OTHER PUBLICATIONS

English language translation of Official Action issued by Chinese Patent Office on Apr. 18, 2013 in Chinese Application No. 201110064921.0 (6 PGS).

* cited by examiner

IMAGE PROCESSING APPARATUS, DISPLAY CONTROL METHOD THEREFOR, AND RECORDING MEDIUM

This application claims priority under 35 U.S.C. §119 to Japanese Patent Application No. 2010-060007 filed on Mar. 16, 2010, the entire disclosure of which is incorporated herein by reference in its entirety.

BACKGROUND OF THE INVENTION

1. Technical Field

The present invention relates to: an image processing apparatus having a number of functions installed thereon, capable of displaying function buttons to call out screens for setting the functions on a display, for example of an operation panel; a display control method of controlling the display of the function buttons on the image processing apparatus; and a computer-readable recording medium having a display control program stored thereon to make a computer of the image processing apparatus implement the display control method.

2. Background Technology

The following description sets forth the inventor's knowledge of related art and problems therein and should not be construed as an admission of knowledge in the prior art.

The image processing apparatuses of recent years have gotten a number of executable functions installed thereon, as represented by a multifunctional image forming apparatus (Multi Function Peripheral) with the copy function, the print function, the facsimile function, the scanning function, and the like being installed thereon.

To use such a function, a user needs to display the function setting screen on an operation panel or the like, by pressing a function button to call out the screen. However, with more functions being installed thereon, more function buttons will be displayed on the operation panel accordingly, which may cause them the trouble of having too many function buttons thereon.

In terms of improving the use, it is a conventional practice to display function buttons in a multi-class tree structure. Specifically, function buttons are preliminarily organized by function category, and users select his/her preferred category among those to have a plurality of function buttons of this category on the display, and select his/her preferred function button among those to call out a screen for setting the function, and then perform setting of the function via the screen.

As disclosed in Japanese Unexamined Patent Application No. 2006-243952, an image processing apparatus displays function group icons for printer driver setting in a first display area given to a printer driver setting screen, and when a user presses one of the function group icons, it displays in a second display area, print condition items under the function group icon, and the user can set his/her preferred print condition among them.

As disclosed in Japanese Unexamined Patent Application No. 2006-323504, an image processing apparatus displays a plurality of icons in an icon display area, and allows users to view all these icons by scrolling this area back and forth. And with use of this image processing apparatus, it is advantageous that users can easily check a number of icons or items regardless of whether or not they have used them before and know which functions are assigned to these icons or items.

However, in the practice of displaying function buttons in a multi-class tree structure, users need to go through some screens or scroll the screen back and forth to find a function button of their target function, which is very troublesome.

Specifically, users may feel troublesome when trying to find a function button that they have used before. Furthermore, it is a problem that users may not recognize even if a value set for a function has been changed.

Unfortunately, the Japanese Unexamined Patent Publications No. 2006-243952 and No. 2006-323504 cited above did not provide a perfect technology to resolve these inconveniences.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that allows users to easily find a function button of their target function even if a number of functions are installed thereon, and to easily recognize if a value set for a function has been changed.

It is another object of the present invention to provide a display control method for the image processing apparatus, which allows users to easily find a function button of their target function even if a number of functions are installed thereon, and to easily recognize if a value set for a function has been changed.

It is yet another object of the present invention to provide a computer-readable recording medium having a display control program stored thereon to make a computer of the image processing apparatus implement the display control method.

According to a first aspect of the present invention, an image processing apparatus includes:
  a display portion that is capable of: displaying in an icon display area, all icons that correspond to function buttons for calling out setting screens for setting functions installed on the image processing apparatus, being organized in groups by function attribute; and displaying in a function button display area, function buttons that correspond to some of the icons, which exist at a position that a user points to;
  a position identification portion that identifies the position that a user points to in the icon display area; and
  a display controller that makes the display portion display:
    the icons in the icon display area;
    the function buttons that correspond to the icons existing at the position identified by the position identification portion, in the function button display area; and
    state information indicating the current state of at least one of the functions and/or attribute information indicating the current attribute of at least one of the functions, on/near a function button of the function and/or on/near an icon corresponding to this function button.

According to a second aspect of the present invention, a display control method for the image processing apparatus executes:
  identifying a position that a user points to in an icon display area on a display portion that is capable of:
    displaying in the icon display area, all icons that correspond to function buttons for calling out setting screens for setting functions installed on the image processing apparatus, being organized in groups by function attribute; and displaying in a function button display area, function buttons that correspond to some of the icons, which exist at the identified position; and displaying:

the icons in the icon display area;

the function buttons corresponding to the icons existing at the identified position, in the function button display area; and state information indicating the current state of at least one of the functions and/or attribute information indicating the current attribute of at least one of the functions, on/near a function button of the function and/or on/near an icon corresponding to this function button.

According to a third aspect of the present invention, a computer-readable recording medium has a display control program stored thereon to make a computer of the image processing apparatus execute:

identifying a position that a user points to in an icon display area on a display portion that is capable of:

displaying in the icon display area, all icons that correspond to function buttons for calling out setting screens for setting functions installed on the image processing apparatus, being organized in groups by function attribute; and displaying in a function button display area, function buttons that correspond to some of the icons, which exist at the identified position; and displaying:

the icons in the icon display area;

the function buttons corresponding to the icons existing at the identified position, in the function button display area; and state information indicating the current state of at least one of the functions and/or attribute information indicating the current attribute of at least one of the functions, on/near a function button of the function and/or on/near an icon corresponding to this function button.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
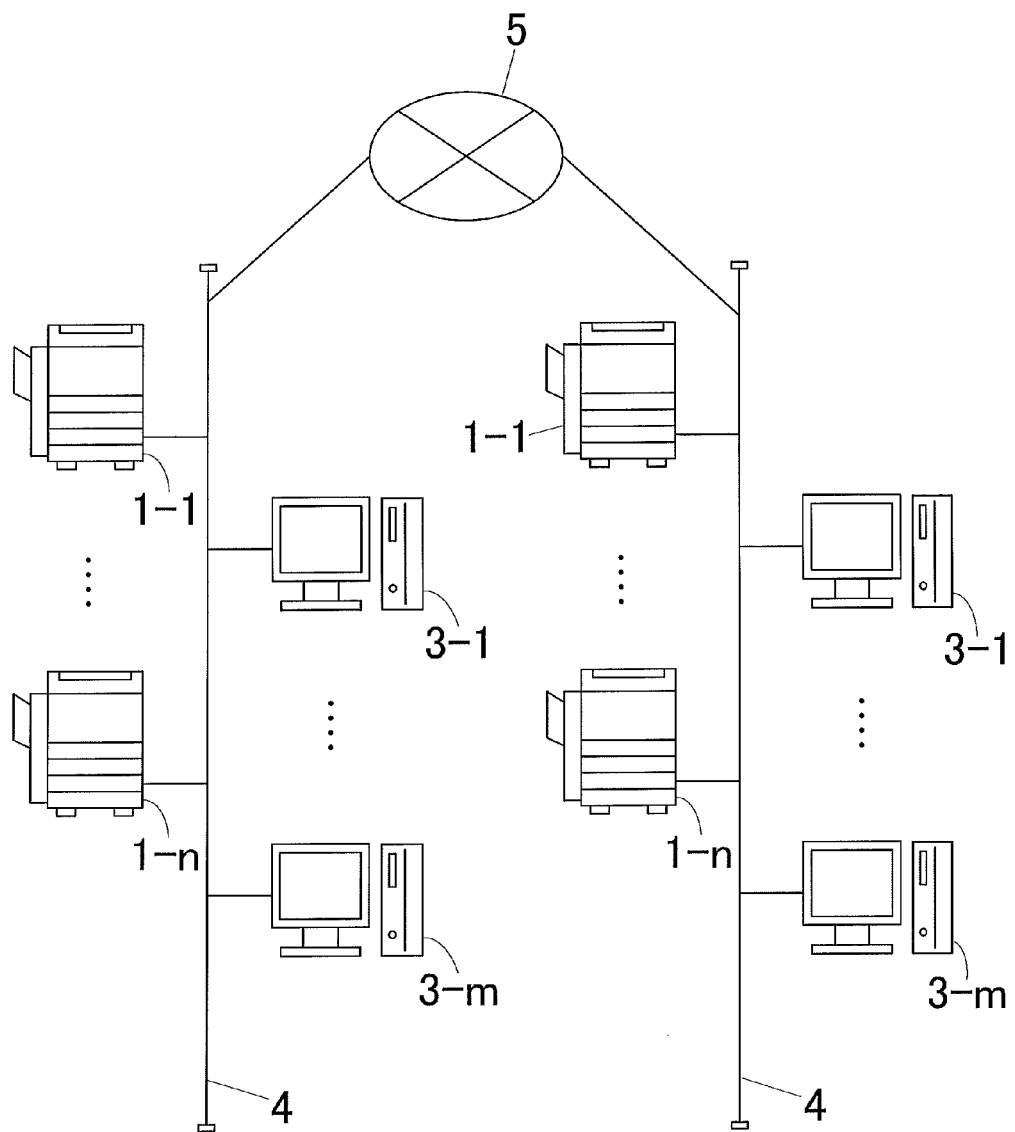
FIG. 1 is a view illustrating a configuration of an image forming system including an image forming apparatus according to one mode of embodied implementation of the present invention.

Hereinafter, one mode of implementing the present invention will be described with reference to the accompanying figures. FIG. 1 is a view to explain a system including an image forming apparatus that is employed as an image processing apparatus according to one mode of implementing the present invention. This system includes an image forming apparatus 1-$x$ (x: 1 to n) and an information processing apparatus 3-$y$ (y: 1 to m). The image forming apparatus 1-$x$ and the information processing apparatus 3-$y$ are connected to each other via a network 4. As the network 4, a dedicated line such as a LAN (Local Area Network), a public line, or a wireless communication may be employed. And the network 4 is connected to other networks via an external network 5.

The image forming apparatus 1-*x* forms on paper, an image read out from a document and a copy image generated based on print data received from the information processing apparatus 3-*y*. Here, print data refers to a rendering command that is issued by an operating system or an application program installed on the information processing apparatus 3-*y* then converted into a page description language by a printer driver so that it can be processed by the image forming apparatus 1-*x*, or document data written in a file format such as PDF, TIFF, JPEG or XPS.

The image forming apparatus 1-*x* may transmit an image read out from a document to the information processing apparatus 3-*y* or other image forming apparatuses, via the network 4. Furthermore, the image forming apparatus 1-*x* may transmit an image read out from a document to other image forming apparatuses or information processing apparatuses existing in another network, via the external network 5.

The information processing apparatus 3-*y* is a general computer including a CPU, a RAM, a fixed recording medium (for example, a hard disk drive), a monitor, a keyboard, a mouse, and the like connected to each other. The information processing apparatus 3-*y* generates print data according to a user operation and transmits the generated print data to the image forming apparatus 1-*x*.

Figure 2:
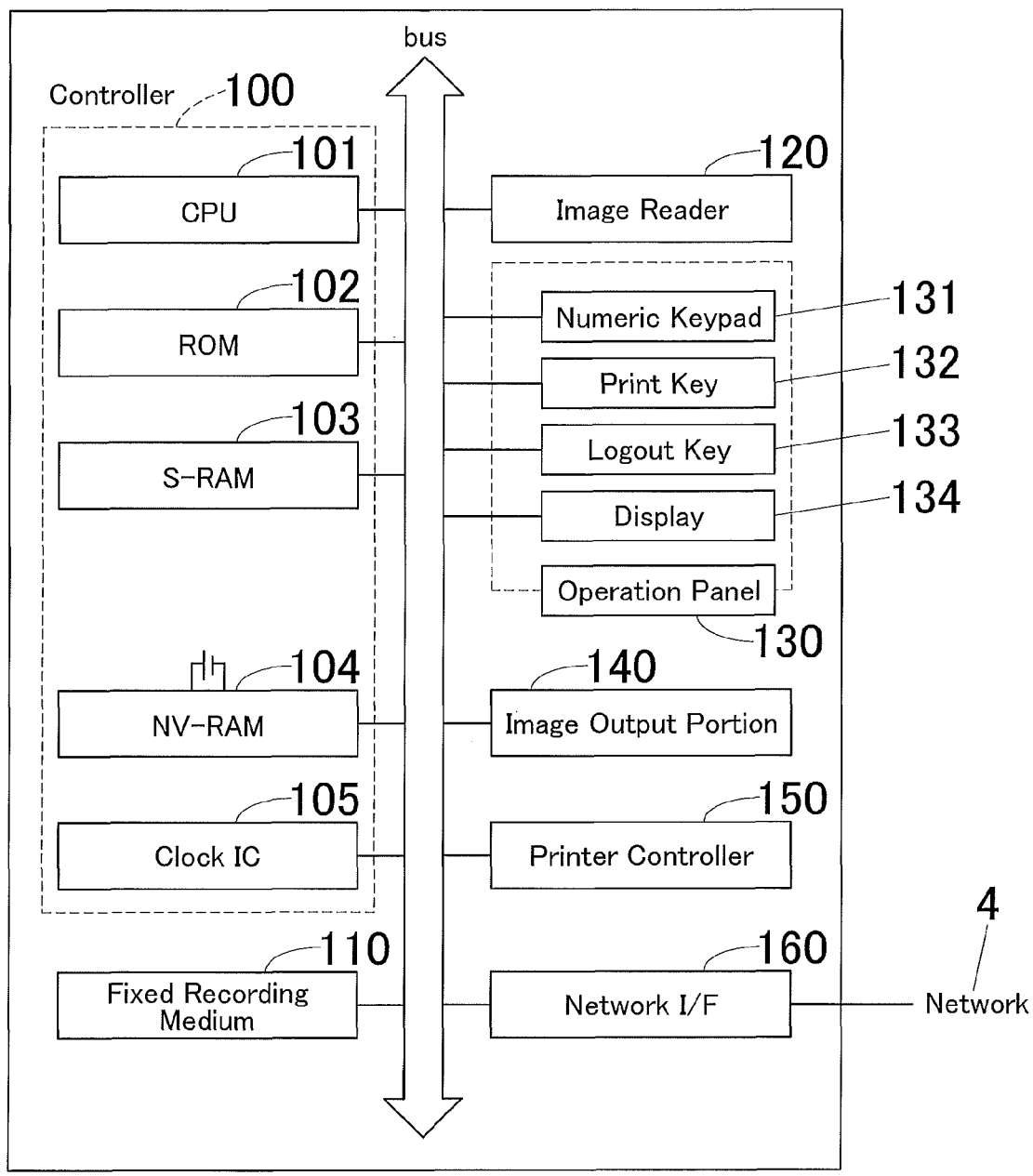
FIG. 2 is a view illustrating an internal configuration of the image forming apparatus of FIG. 1.

FIG. 2 is a view illustrating an internal configuration of the image forming apparatus 1-*x*. In the image forming apparatus 1-*x*, a controller 100 includes: a CPU 101; a ROM 102 storing a control program; a S-RAM (Static Random Access Memory) 103 serving for processing operations; a battery backup NV-RAM (nonvolatile memory) 104 storing various settings about image forming operations; and a Clock IC 105, which are connected to each other via a bus.

The controller 100 is connected to: an image reader 120 reading an image from a document; an operation panel 130 holding various keys such as a numeric keypad 131 serving for various entries, a print key 132, a logout key 133, and the like, and a display 134; a network interface 160 serving for transmitting and receiving various information to and from external machines such as the information processing apparatus 3-*y* connected to the image forming apparatus 1-*x* via the network 4; a printer controller 150 generating a copy image based on print data via the network interface 160; and an image output portion 140 forming a copy image on paper, via the bus, respectively.

Furthermore, the controller 100 is connected to a fixed recording medium 110 via the bus. The fixed recording medium 110 is a hard disk device, for example. The fixed recording medium 110 stores various data in advance.

Hereinbelow, processing flows executed by the image forming apparatus 1-*x* will be described.

Figure 3:
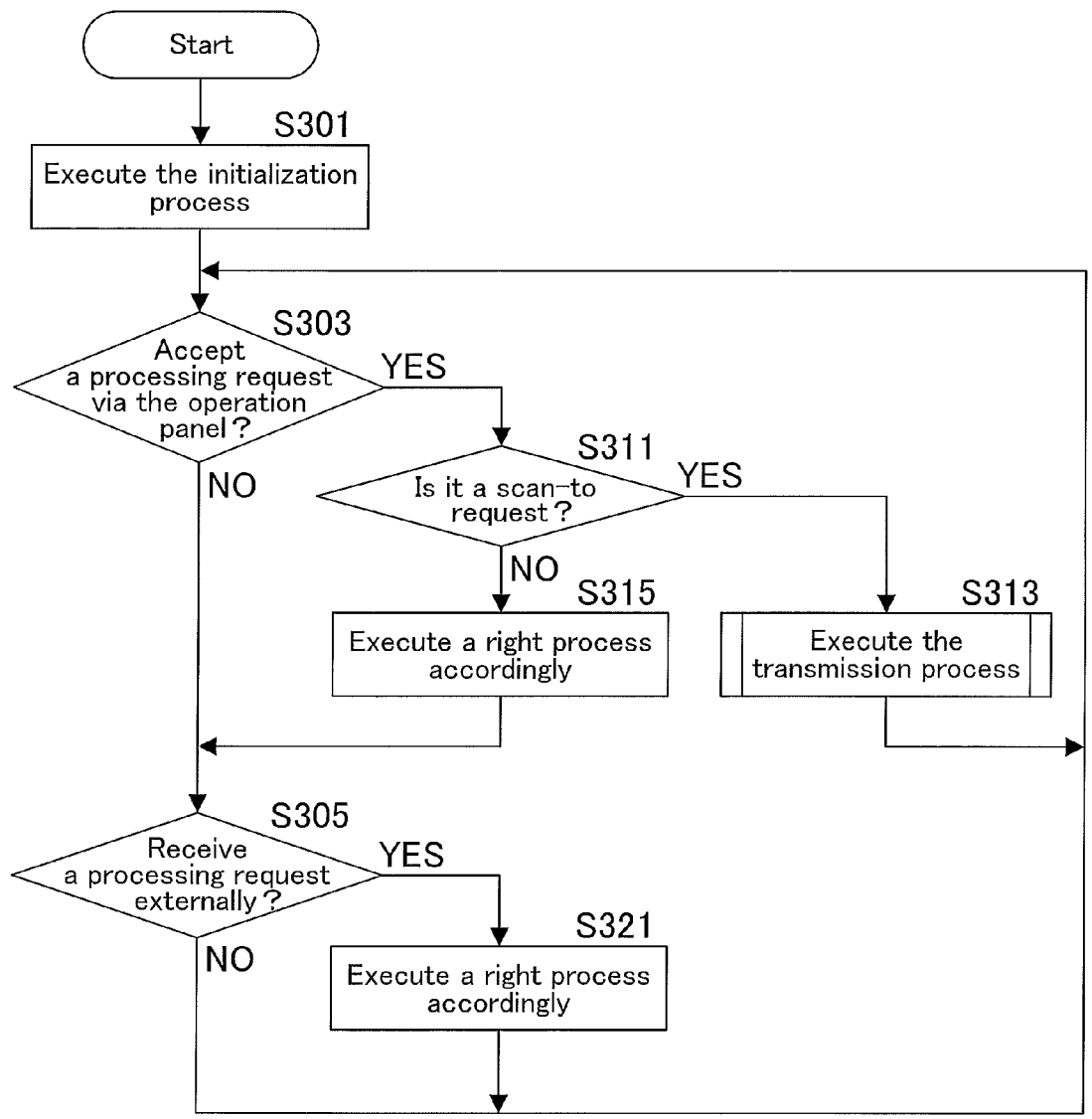
FIG. 3 is a flowchart representing an entire processing flow of the image forming apparatus.

First of all, a main processing routine of the image forming apparatus 1-*x* will be described with reference to a flowchart illustrated in FIG. 3.

Turning on the power, the CPU 101 starts the main processing routine. The initialization process, for example, memory clearance, employment of the standard mode, and the like is executed (Step S301).

After execution of the initialization process, it is judged whether or not a processing request (a copy request, a setting request, or the like) is entered by a user via the keyboard or the display 134 of the operation panel 130 of the image forming apparatus 1-*x* (Step S303). If no processing request is entered (NO in Step S303), the routine goes to Step S305.

If a processing request is entered by a user (YES in Step S303), then it is judged in Step S311, whether or not it is a scan-to request. If it is a scan-to request (YES in Step S311), a transmission process is executed in Step S313.

If it is not a scan-to request (NO in Step S311), a right process is executed according to the request in Step S315. Here, if not a scan-to process, a process of copying or scanning a document, a process of changing the various settings stored on the NV-RAM 104, or the like is executed according to the request entered by a user via the keyboard or the display 134 of the operation panel 130 of the image forming apparatus 1-*x*. After execution of the user's requested process, the routine goes to Step S305.

In Step S305, it is judged whether or not a processing request (a document print request, a setting request, or the like) is received from an external machine such as the information processing apparatus 3-*y*, via the network 4. If no processing request is received (NO in Step S305), the routine goes back to Step S303.

If a processing request is received from an external machine (YES in Step S305), a right process is executed according to the request in Step S321. Here, the right process may be executing a print job received from the information processing apparatus 3-*y*, a process of changing the various settings stored on the NV-RAM 104, or the like. After execution of all the requested processes from the external machine, the routine goes tack to Step S303 to repeat the sequence described above.

Hereinafter, operation screens displayed on the display 134 of the operation panel 130 will be described.

Figure 4:
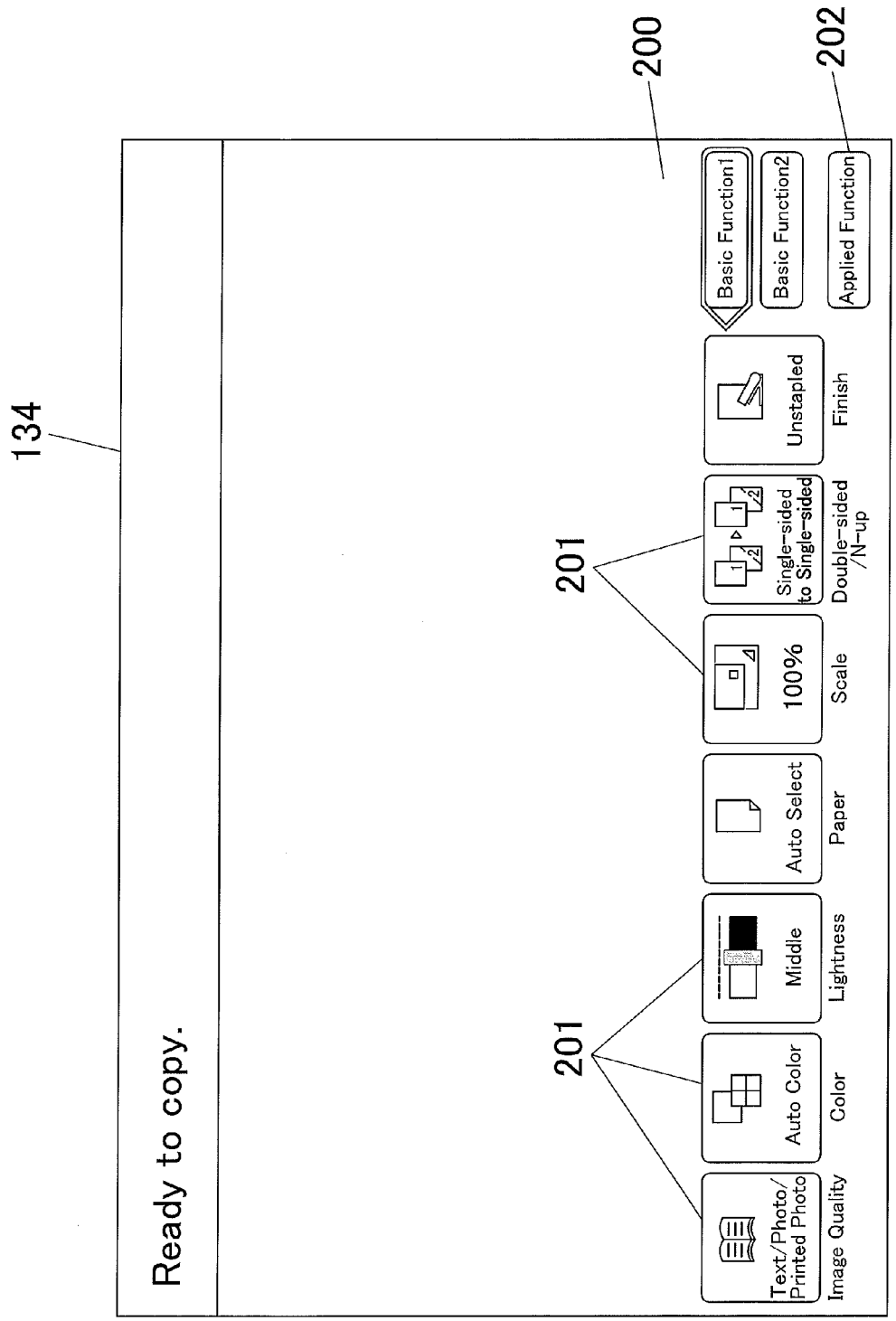
FIG. 4 is a view illustrating an example of a screen that is displayed on a display of an operation panel in the basic mode.

FIG. 4 is a basic mode screen displayed on the display 134. On this basic mode screen, a copy setting screen is displayed, and various setting buttons 201 for determining copy conditions are provided in a basic setting display area 200 in the bottom part of the basic mode screen. And in the bottom right corner of the copy setting screen, an "Applied Function" button 202 is provided.

Figure 5:
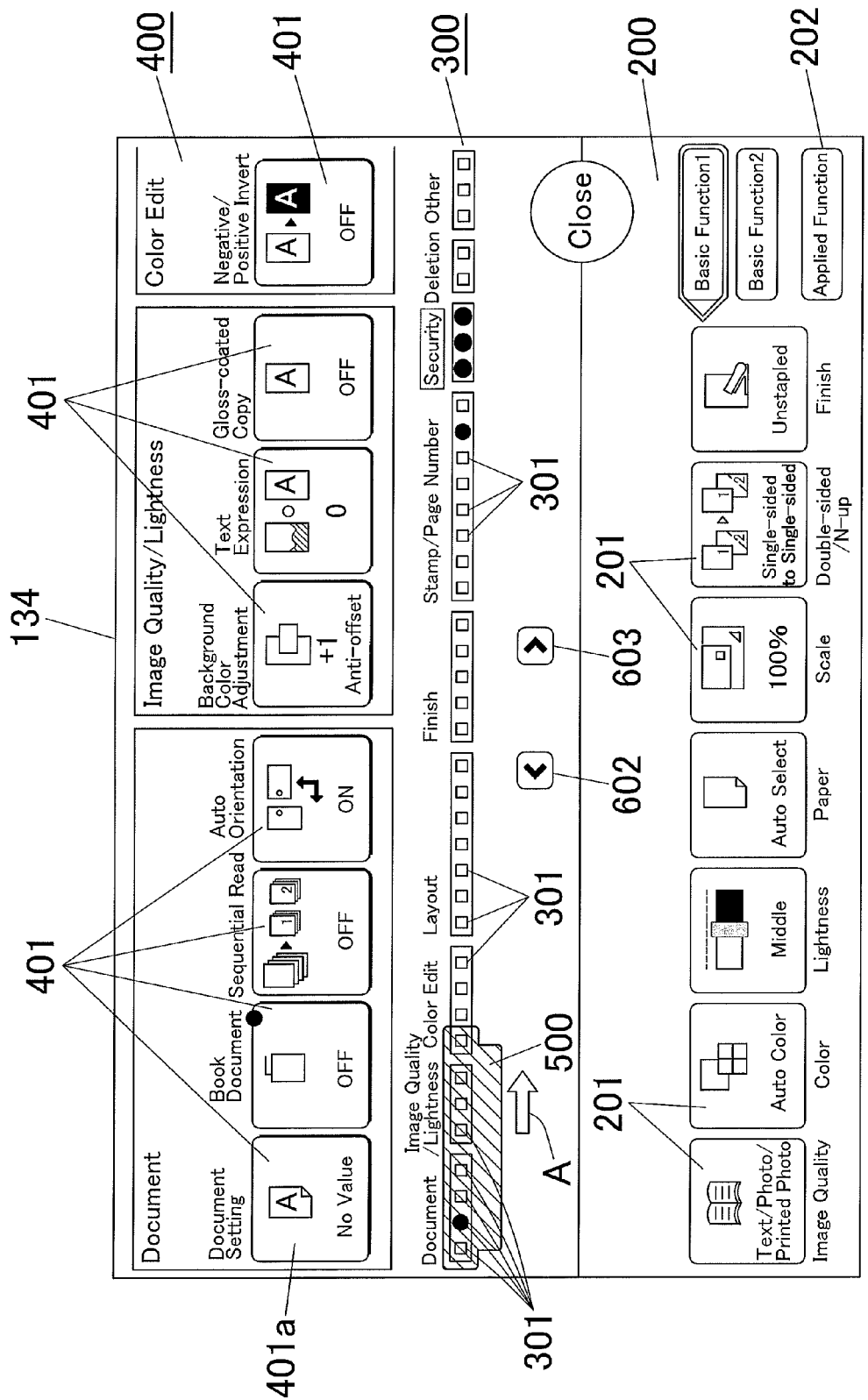
FIG. 5 is a view illustrating an example of a screen that is displayed on a display of an operation panel in the applied mode.

When a user presses this "Applied Function" button 202, the image forming apparatus 1-*x* will turn into the applied mode, and switch the basic mode screen illustrated in FIG. 4 to an initial applied mode screen illustrated in FIG. 5. The applied mode allows users to use various functions other than the copy function, which are also installed on the image forming apparatus 1-*x*.

On the applied mode screen illustrated in FIG. 5, an icon display area 300 is positioned approximately in the middle of the screen in the vertical direction of the display 134, and a function button display area 400 is positioned above the icon display area 300 in the plane view, adjacent to the icon display area 300.

In the icon display area 300, approximately all icons that correspond to function buttons for calling out setting screens for setting the functions installed on the image forming apparatus 1-*x* are displayed, being organized in groups by function attribute. Here, a number of icons 301 represented by squares appear in their respective groups, in one line in the horizontal direction. In other words, a mapping list of the functions installed on the image forming apparatus 1-*x* is displayed in this icon display area 300.

In this mode of embodied implementation, groups that the icons 301 belong to are "Document", "Image Quality/Lightness", and "Color Edit", for example, as illustrated in FIG. 5. Four icons 301 belong to the "Document" group, so users can understand that four function buttons are organized in this group.

Similarly, three icons 301 belong to the "Image Quality/Lightness" group and four icons 301 belong to the "Color Edit" group, so users can understand that three function buttons are organized in the "Image Quality/Lightness" group and four function buttons are organized in the "Color Edit" group, respectively.

Furthermore, a cursor 500 (represented by a shadow area) is displayed in the icon display area 300, pointing to a plurality of icons 301 at the same time. Users can arbitrarily slide this cursor 500 from side to side over the icon display area 300, by touching and dragging it in the array direction of the icons 301. In this mode of embodied implementation, the cursor 500 moves always pointing to eight icons 301.

And the function buttons 401 corresponding to the eight icons 301 that the cursor 500 point to are displayed in their respective groups just like the icons 301, in the function button display area 400 adjacent to the icon display area 300.

In the example of FIG. 5, the cursor 500 points to four icons 301 of the "Document" group, three icons 301 of the "Image Quality/Lightness" group, and one icon 301 of the "Color Edit" group. Accordingly, the four corresponding function buttons 401 from the "Document" group, the three corresponding function buttons 401 from the "Image Quality/Lightness" group, and the one corresponding function button 401 from the "Color Edit" group are displayed in their respective groups and with names of the groups, in the function button display area 400. In this mode of embodied implementation, the four corresponding function buttons 401 from the "Document" group are the "Document Setting", "Book Document", "Sequential Read", and "Auto Orientation" buttons, the three corresponding function buttons 401 are the "Background Color Adjustment", "Text Expression", and "Gloss-coated" buttons, and the one corresponding function button 401 is the "Negative/Positive Invert" button.

In this given context, when a user touches the cursor 500 and slides it to the right as indicated by Arrow A in FIG. 5, only by a distance for one icon, for example, then the cursor 500 will point to three icons of the "Document" group, three icons of the "Image Quality/Lightness" group, and two icons of the "Color Edit" group. And accordingly, on the display 134, the seven function buttons 401 will individually go to the left by a distance of one button, so that the function button display area 400 can accept another function button 401 corresponding to a next icon 301*b* of the "Color Edit" group at right end, while missing the "Document Setting" button at left end.

Figure 6:
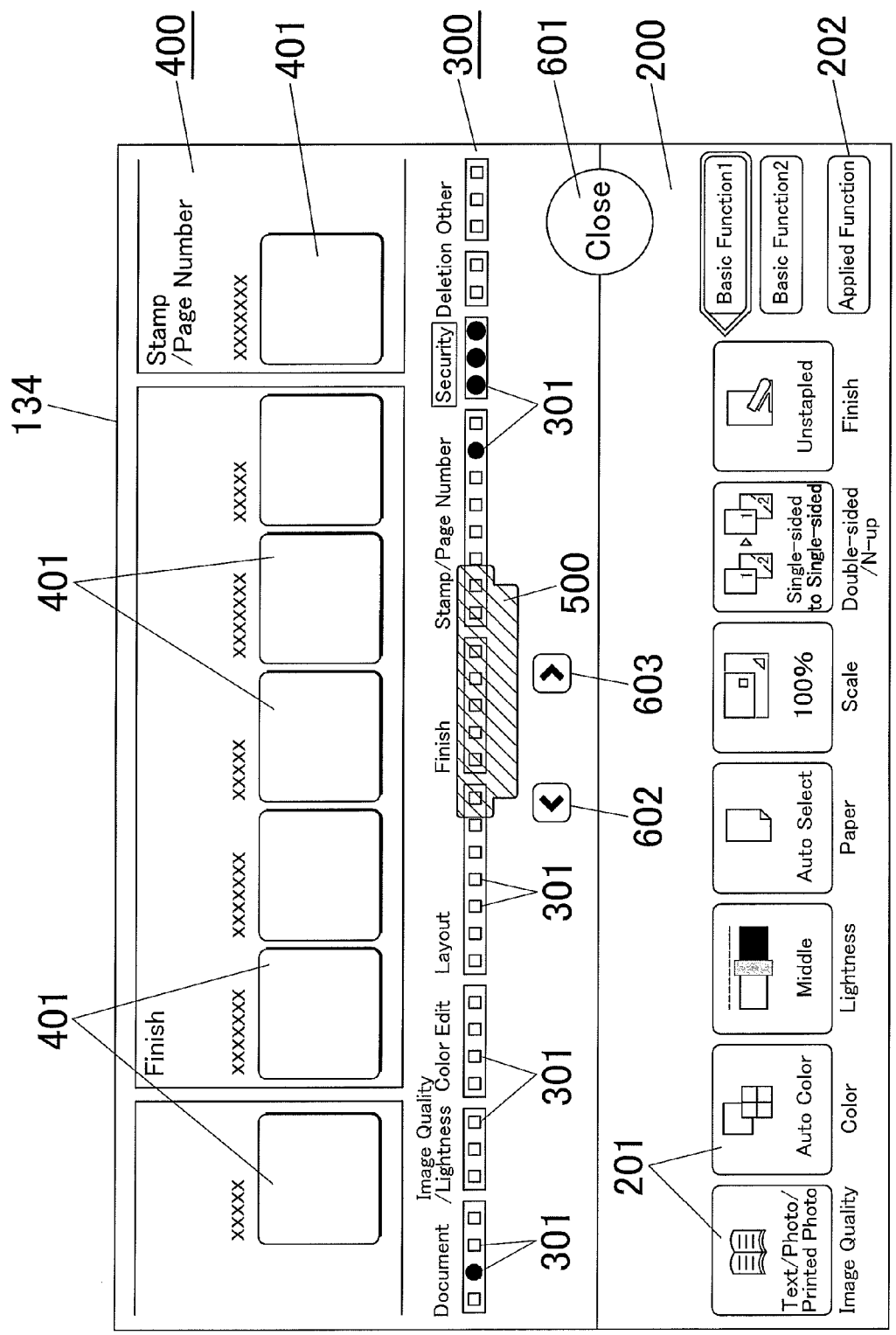
FIG. 6 is a view illustrating how the screen of FIG. 5 will look like when sliding a cursor.

When further sliding the cursor 500 until obtaining the screen illustrated in FIG. 6, the user will obtain in the function button display area 400, other eight function buttons 401 corresponding to icons 301 that the cursor 500 newly point to. While the user is sliding the cursor 500, the display of function buttons 401 in the function button display area 400 may sequentially change at every motion of the cursor 500. When the user touches an icon 301 in the icon display area 300, the cursor 500 may jump to the target position quickly.

As described above, function buttons 401 are never displayed in a multi-class tree structure, which is different from the conventional practice. In this mode of embodied implementation, users only touch the cursor 500 and slide it until obtaining eight function buttons 401 of their target functions in the function button display area 400, and do not need any more to go through some screens or scroll a screen back and forth to find a function button of their target function, which would greatly improve to user operability for intuitive decision-making.

Furthermore, users can intuitively know which ones among such a number of function buttons 401 are currently displayed because of the existence of the icon display area 300. And since the length of the cursor 500 is fixed so that a predetermined number of function buttons 401 can always appear, users can instantly know which icons 301 in the icon display area 300, correspond to the function buttons 401 currently displayed on the screen, which would greatly improve user-friendliness.

In the modes of embodied implementation in FIGS. 5 and 6, users slide the cursor 500 until obtaining function buttons 401 of their target functions in the function button display area 400. Or alternatively, it can be configured such that users only touch an icon 301 in the icon display area 300 without use of the cursor 500, then obtain a predetermined number of function buttons in the function button display area 400, which correspond to icons existing at or in the vicinity of their contact position that is identified by the controller 100. In this configuration, while a user is holding and drawing his/her contact position on the screen, the display of function buttons 401 in the function button display area 400 may sequentially change at every motion.

In addition to the icons 301 and the function buttons 401, a "Close" button 601, a "Back" button 602, a "Next" button 603, and the like are displayed on the screens of FIGS. 5 and 6. The "Close" button 601 serves to finish the applied mode and go back to the basic mode screen. The "Back" button 602 serves to display function buttons 401 in a group existing in the list right before the group of the function buttons 401 currently displayed on the screen, and the "Next" button 603 serves to display function buttons 401 in a group existing in the list right after the group of the function buttons 401 currently displayed on the screen.

Figure 7:
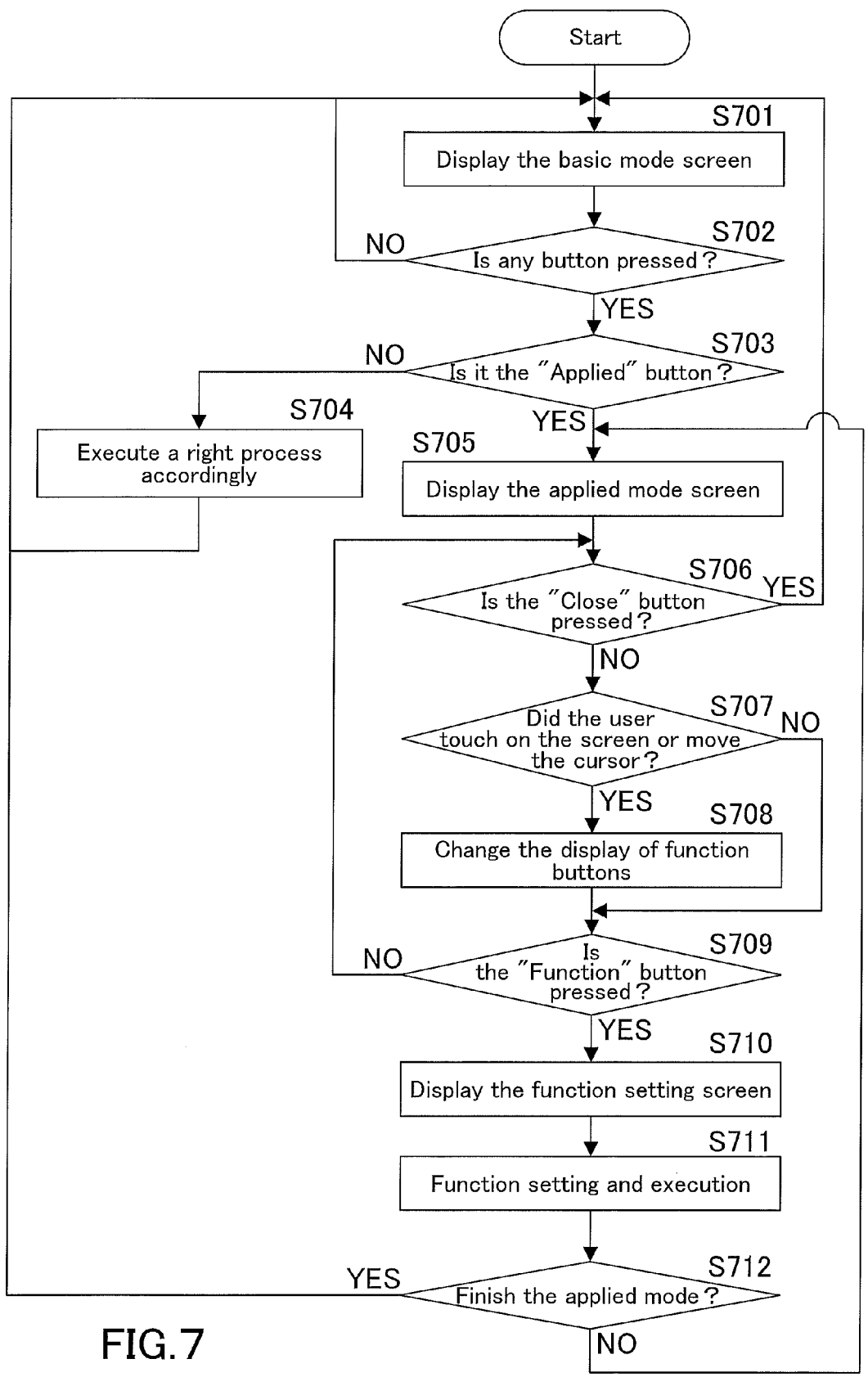
FIG. 7 is a flowchart representing a display control process executed by the image forming apparatus.

FIG. 7 is a flowchart representing a display control process to control the display 134. The processing routine is executed by the CPU 101 of the controller 100 of the image forming apparatus 1-*x* according to a program stored on a recording medium such as the ROM 102.

In Step S701, the basic mode screen illustrated in FIG. 4 is displayed. And in Step S702, it is judged whether or not any button is pressed via the basic mode screen. If no button is pressed (NO in Step S702), the routine goes back to Step S701 to keep displaying the basic mode screen.

If any button is pressed (YES in Step S702), then it is judged in Step S7063, whether or not it is the "Applied Function" button 202. If it is not the "Applied Function" button 202 (NO in Step S703), a right process is executed according to the pressed button in Step S704, and then the routine goes back to Step S701.

If it is the "Applied Function" button 202 (YES in Step S703), the applied mode is employed and the initial applied mode screen illustrated in FIG. 5 is displayed on the display 134, in Step S705. Subsequently, in Step S706, it is judged whether or not the "Close" button 601 is pressed. If the "Close" button 601 is pressed (YES in Step S706), the applied mode is finished and the routine goes back to Step S701 to display the basic mode screen.

If the "Close" button 601 is not pressed (NO in Step S706), then it is judged in Step S707, whether the user touched an arbitrary position in the icon display area 300 or the user moved the cursor 500 if it is provided.

If the user did not touch a position or move the cursor 500 (NO in Step S707), the routine proceeds to Step S709. If the user touched a position or moved the cursor 500 (YES in Step S707), his/her contact position in the icon display area 300 or the current position of the cursor 500 is identified, and the screen with function buttons 401 in the function button area 400 is switched to another screen with function buttons 401 corresponding to icons 301 existing at the identified position, in Step S708. After that, the routine proceeds to Step S709.

In Step S709, it is judged whether or not any of the function buttons 401 in the function button display area 400 is pressed by the user. If none of the function buttons 401 is pressed (NO in Step S709), the routine goes back to Step S706. If any of the function buttons 401 is pressed (YES in Step S709), the function setting screen for the pressed function button 401 is displayed on the display 134, in Step S710. Subsequently, in Step S711, the user performs function setting and the function is executed according to the setting. And then, the routine proceeds to Step S712.

In Step S712, it is judged whether or not an instruction to finish the applied mode is given by the user. If such an instruction is not given (NO in Step S712), the routine goes back to Step S705 to display the applied mode screen illustrated in FIG. 5. On the other hand, if an instruction to finish the applied mode is given (YES in Step S712), the routine goes back to Step S701 to display the basic mode screen.

Figure 8:
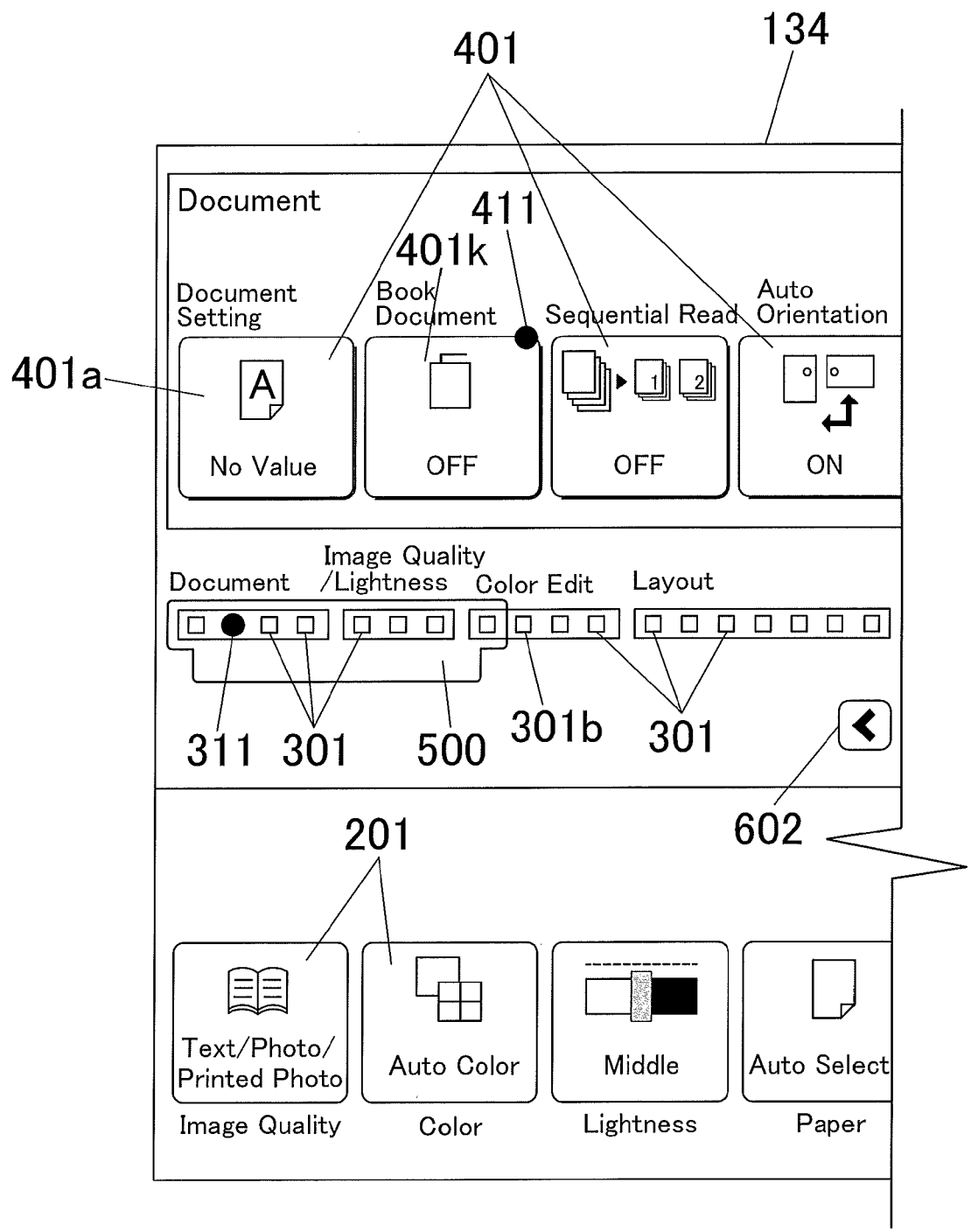
FIG. 8 is a view illustrating an enlarged image of a left half of the screen of FIG. 5.
Figure 9:
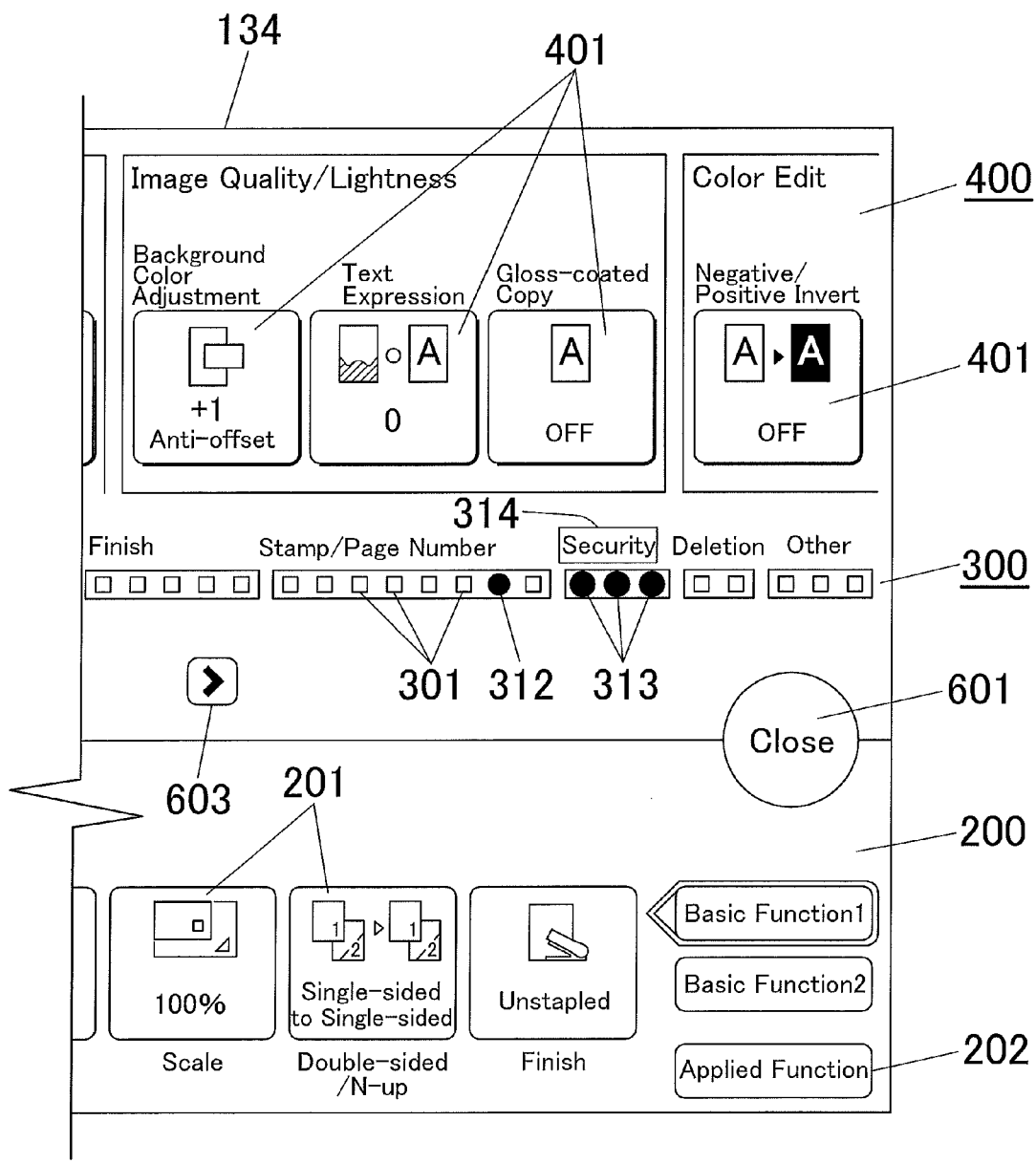
FIG. 9 is a view illustrating an enlarged image of a right half of the screen of FIG. 5.

FIGS. 9 and 8 are enlarged views of a right half and a left half of the screen of FIG. 5, respectively. In this mode of embodied implementation, status information indicating the current status of a predetermined function is displayed on the screen.

In other words, as illustrated in FIG. 8, there is a mark 411 in a particular color (yellow, for example) at the upper right-hand corner of the "Book Document" button 401k of the "Document" group. This mark 411 represents status information indicating the current state of the "Book Document" button 401k, i.e. indicating that the default value has been changed by a user or the like. Hereinafter, a mark indicating the current state will also be referred to as "state mark". Also, a state mark 311, which is similar to the state mark 411 on the "Book Document" button 401k, is put on one of the icon 301 in the icon display area 300, corresponding to the "Book Document" button 401k. Therefore, when a user finds the state mark 311 on the icon 301 or the state mark 411 on the function button 401k, he/she will easily know that the default value for "Book Document" has been changed. Also, when a user hopes to check the value set for the function, for example, he/she will instantly access the function only by touching (pressing) the function button 401 with the state mark 411.

Also, as illustrated in FIG. 9, a state mark 312 indicating that the default value has been changed, which is similar to the state mark 311, is put on an icon 301 of the "Stamp/Page Number" group.

Meanwhile, also as illustrated in FIG. 9, a state mark 313 is put on all the icons 301 of the "Security" group, but in a different color (red, for example) than the state mark 311 on the icon 301 of the "Book Document" group or the state mark 312 on the icon 301 of the "Stamp/Page Number" group. These state marks 313 indicate the current state of the functions in the "Security" group, and specifically, indicate that the currently operating user is prohibited from changing the values set for the functions, or from ever using the functions. In this example, the user is prohibited from changing the values set for all the functions in the "Security" group, or from using all these functions, and so the group name "Security" given to the icon display area 300 is enclosed in a box 314 in the same color as the state marks 313.

Also, a state mark, which is similar to the state mark 313, is put on the function buttons 401 of the "Security" group, although it is not illustrated in this Figure.

Therefore, when a user finds the state marks 313 on all the icons 301 of the "Security" group or the state marks on all the function buttons 401 of the "Security" group, he/she can easily know that the user is prohibited from changing the values set for all the functions in the "Security" group, or prohibited from using all the functions in this group.

An administrator, a departmental manager, or the like who holds a superior authority determines whether or not to permit users to change the values set for the functions in the "Security" group. If some of the functions installed on the image forming apparatus 1-x happen to be unavailable because of a temporal out-of-order for example, the image forming apparatus 1-x may automatically put a state mark on function buttons 401 or icons 301 of the unavailable functions. In that case, the controller 100 monitors the current state of the image forming apparatus 1-x as described above with reference to FIG. 2, and a state mark is automatically given depending on the monitoring result.

As described above, a state mark representing status information is put on icons 301 or function buttons 401, and users who make full use of a number of functions now do not need any more to go through multi-class screens to check or change a set value, which is different from the conventional practice. That would greatly improve user operability. It should be also noted that users can instantly know that a value set for which function button of which function group has been changed.

Hereinabove, the state marks 311, 312, and 411 indicating that the values set for the functions have been changed are displayed in a different color than the state marks 313 indicating that the user is prohibited from using the functions, or alternatively, the former may be displayed in a different shape or size than the latter. Color, shape, size and the like can be arbitrarily changed.

The state marks 311, 411, 312, and 313 are put on the icon 301 or the function button 401, or alternatively, those may be put in the vicinity of the icon 301 or the function button 401.

Both the icons 301 and the function button 401 hold a status mark(s), or alternatively, either the icons 301 or the function button 401 may hold a state mark(s).

Figure 10:
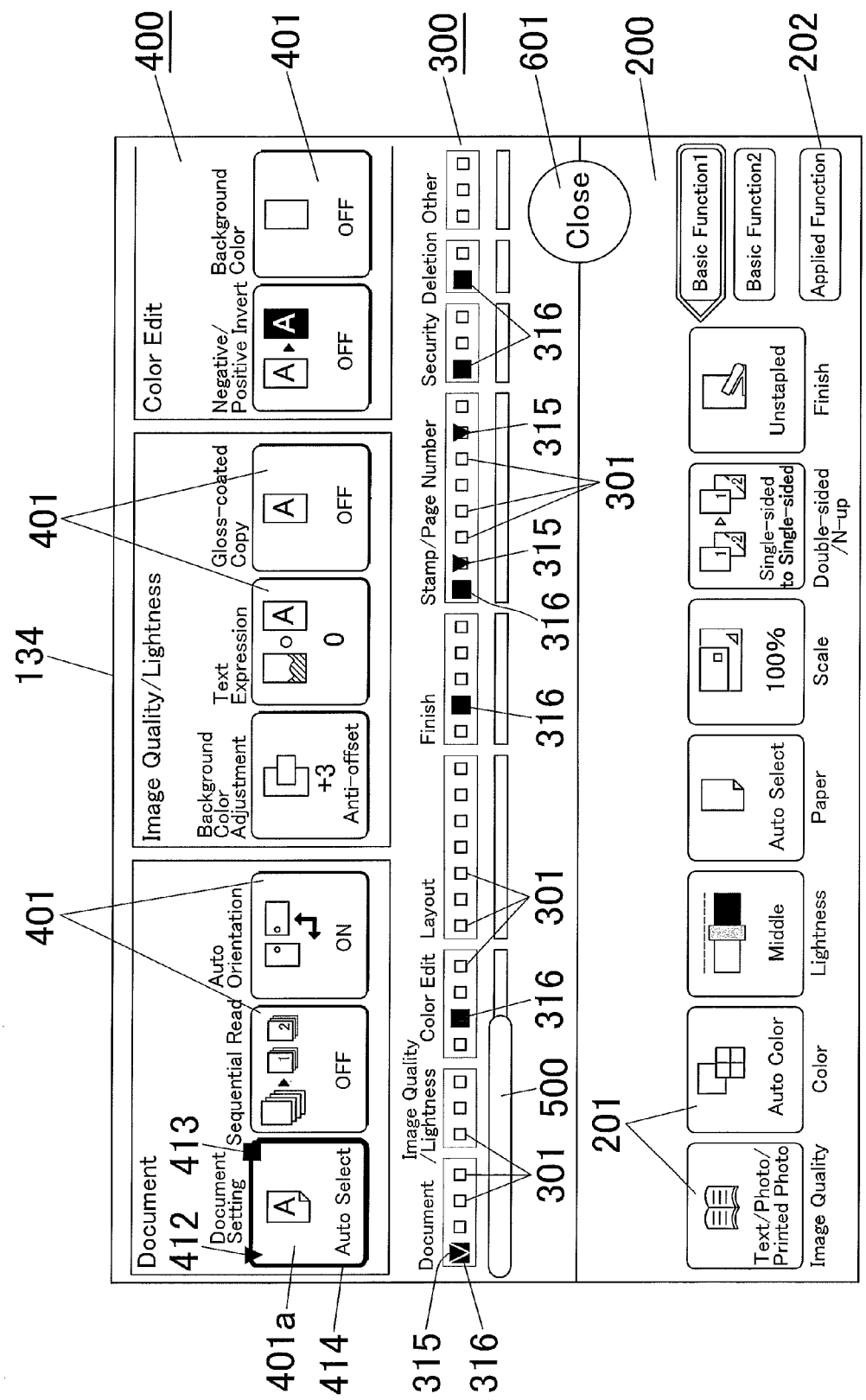
FIG. 10 relates to another mode of implementing the present invention, and is a view illustrating a screen with state information of functions and bookmarks given to the functions.

FIG. 10 relates to another mode of implementing the present invention. In this mode of embodied implementation, attribute information indicating the current attribute of a predetermined function is displayed on the screen.

In other words, there is an upside-down triangular-shaped mark 412 in a particular color (yellow, for example) at the upper left-hand corner of the "Document Setting" button 401a of the "Document" group. This mark 412 represents attribute information indicating the current attribute of the "Document Setting" button 401a. Specifically, in this mode of embodied implementation, it represents a bookmark given by a user. Hereinafter, a mark representing a bookmark will also be referred to as "bookmark" in a pretty simple manner. Also, a bookmark 315, which is similar to the bookmark 412 on the "Document Setting" button 401a, is put on an icon 301 corresponding to the "Document Setting" button 401a.

Furthermore, there is a square-shaped state mark 413 indicating that the value set for "Document Setting" has been changed, in a particular color (green, for example) at the upper right-hand corner of the "Document Setting" button 401a. Also, a state mark 316, which is similar to the state mark 413, is put on the icon 301 corresponding to the "Document Setting" button 401a, so as to be combined with the bookmark 315. Similarly, square-shaped state marks 316 indicating that the set value has been changed are put on some icons 301 of other groups.

The bookmark 315 is put on two icons 301 of the "Stamp/Page Number" group, and a bookmark, which is similar to the bookmark 315, is also put on function buttons 401 corresponding to the two icons 301, although it is not illustrated in this Figure.

Therefore, when a user finds the bookmark 315 on the icon 301 or the bookmark 412 on the function button 401, he/she can easily know that a bookmark is given to "Document Setting". Also, when a user hopes to check the value set for the function, for example, he/she will instantly access the function only by touching (pressing) the function button 401 with the bookmark 412.

Furthermore, in the example of FIG. 10, the "Document Setting" button 401a is enclosed in a frame 414 in a particular color (yellow, for example) or enclosed in a heavy-line frame 414, indicating that the user is now trying to change the value set for "Document Setting". And thus, users can easily know which function they are trying to change the value set for, which would improve user operability.

The bookmark 315 and the bookmark 412 are put on the icon 301a and the function button 401a, or alternatively, those may be put in the vicinity of the icon 301a and the function button 401, respectively.

Both the icon 301 and the function button 401 hold a bookmark, or alternatively, either the icon 301 or the function button 401 may hold a bookmark.

Figure 11:
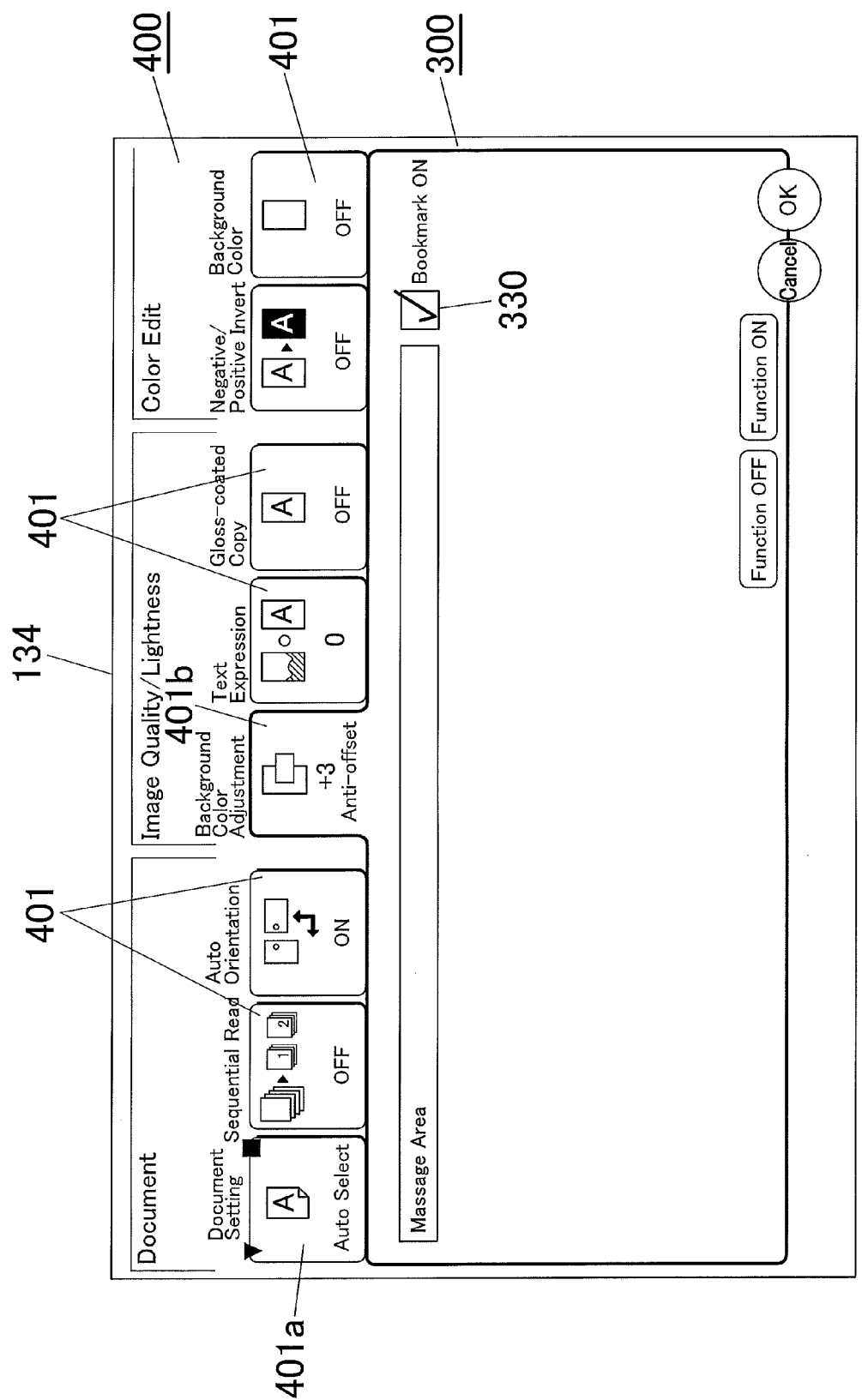
FIG. 11 is a view illustrating a screen for bookmark setting.

FIG. 11 is a view illustrating a setting screen for bookmark setting (ON/OFF). Users press his/her preferred function button 401b to call out a "Bookmark ON" check box 330, and can easily turn the bookmark ON/OFF via the screen by placing or removing a check mark on the check box 330. If a user turns the bookmark ON about his/her frequently used function, he/she will be able to access this function rapidly without use of the cursor 500.

The controller 100 illustrated in FIG. 2 always monitors bookmark ON/OFF information. Furthermore, even if the system happens to be reset or the image forming apparatus 1-x is powered OFF then ON again, the bookmark ON/OFF information will still be kept since backup copy is stored on the S-RAM 103. That is, despite occurrence of a trouble in machine during operation, users can continuously operate the machine. Every authorized user is responsible for control and backup of his/her own bookmark ON/OFF information is performed, or alternatively, every department is responsible for control and backup of its members' bookmark ON/OFF information. Specific users having a superior authority, such as an administrator, are also allowed to determine whether or not to permit general users to give a bookmark (turn the bookmark ON/OFF).

Figure 12:
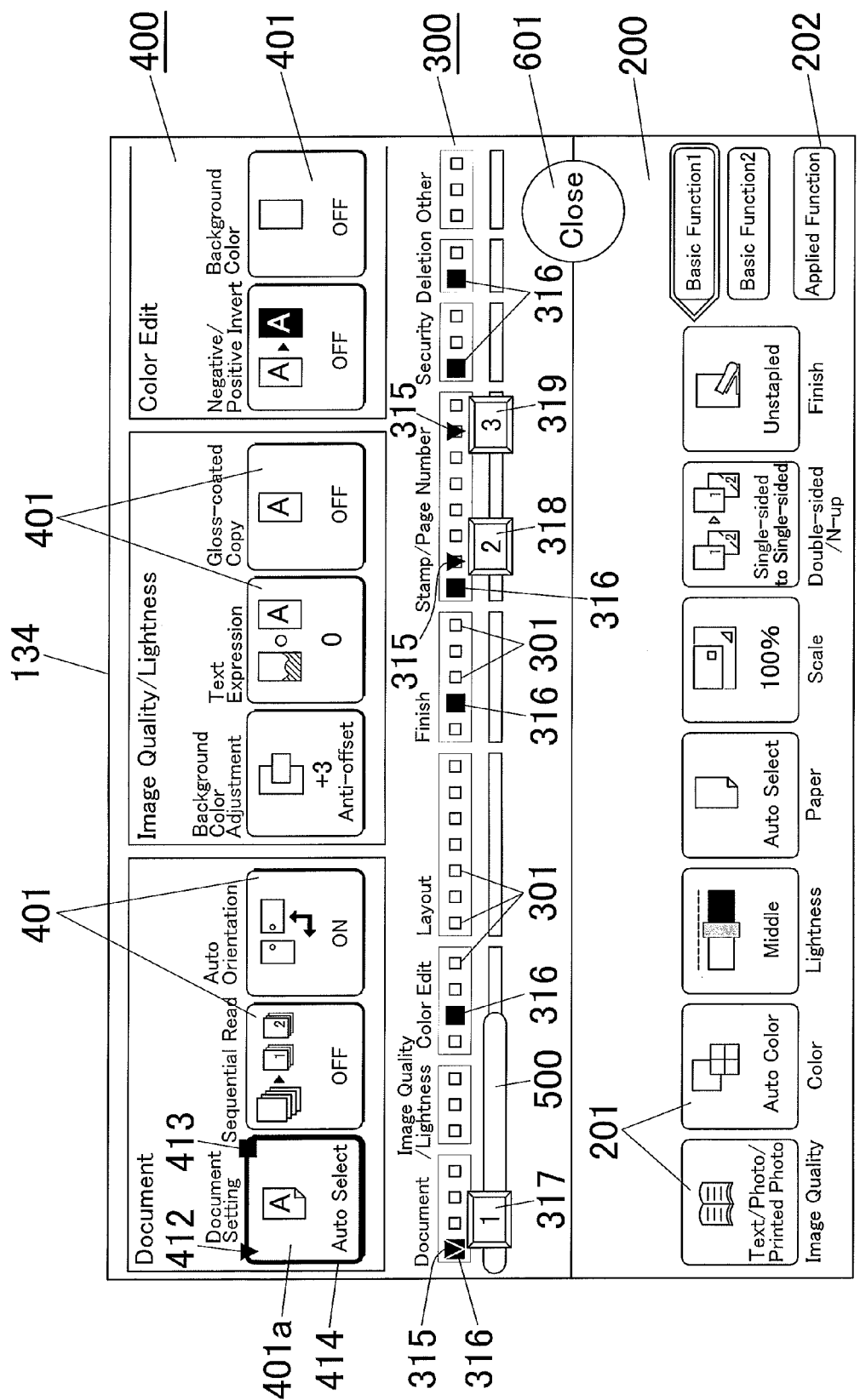
FIG. 12 relates to yet another mode of implementing the present invention, and is a view illustrating a screen with a number on every bookmark.

FIG. 12 relates to yet another mode of implementing the present invention. In this mode of embodied implementation, a number is displayed on a bookmark that is put on an icon 301.

In other words, as illustrated in FIG. 12, an upside-down triangular-shaped bookmark 315 is put on a plurality icons 301, indicating that the bookmark is given to the functions represented by these icons 301. Also, numbers 317, 318, and 319 are displayed under the icons 301 with the bookmark 315, as additional information. These numbers are issued when a user turns the bookmark ON. In place of numbers, any other type of symbol may represent a bookmark as long as it can be identified from one another, for example, alphabets.

With use of identification symbols on the bookmark 315, a plurality of users can teach each other screen handling, and an administrator can teach general users screen handling. Also, with use of identification symbols, they can teach screen handling or function details for the purpose of promoting the use of rarely used functions, a function of encrypting a file read out by a scanner, or the like. In other words, that can serve just like an operation manual.

The identification symbols may be manually specified by a user, and also may be automatically specified by the controller 100. For example, sequential numbers are displayed so that users can easily perform operation according to the numbers, and also so that users will not get an end result with a restricted combination of functions. Specifically, when setting "Finish", it would be better to complete setting binding margin prior to turning hole punching ON. Therefore, when a user touches the hole punching function button, a number indicating a right operation will be displayed on the binding margin button or a bookmark put on the icon corresponding to this button. And thus, users can proceed with setting change in accordance with the order displayed on the operation panel, which would improve the use of the image forming apparatus 1-x in cost-effectiveness and reliability.

Figure 13:
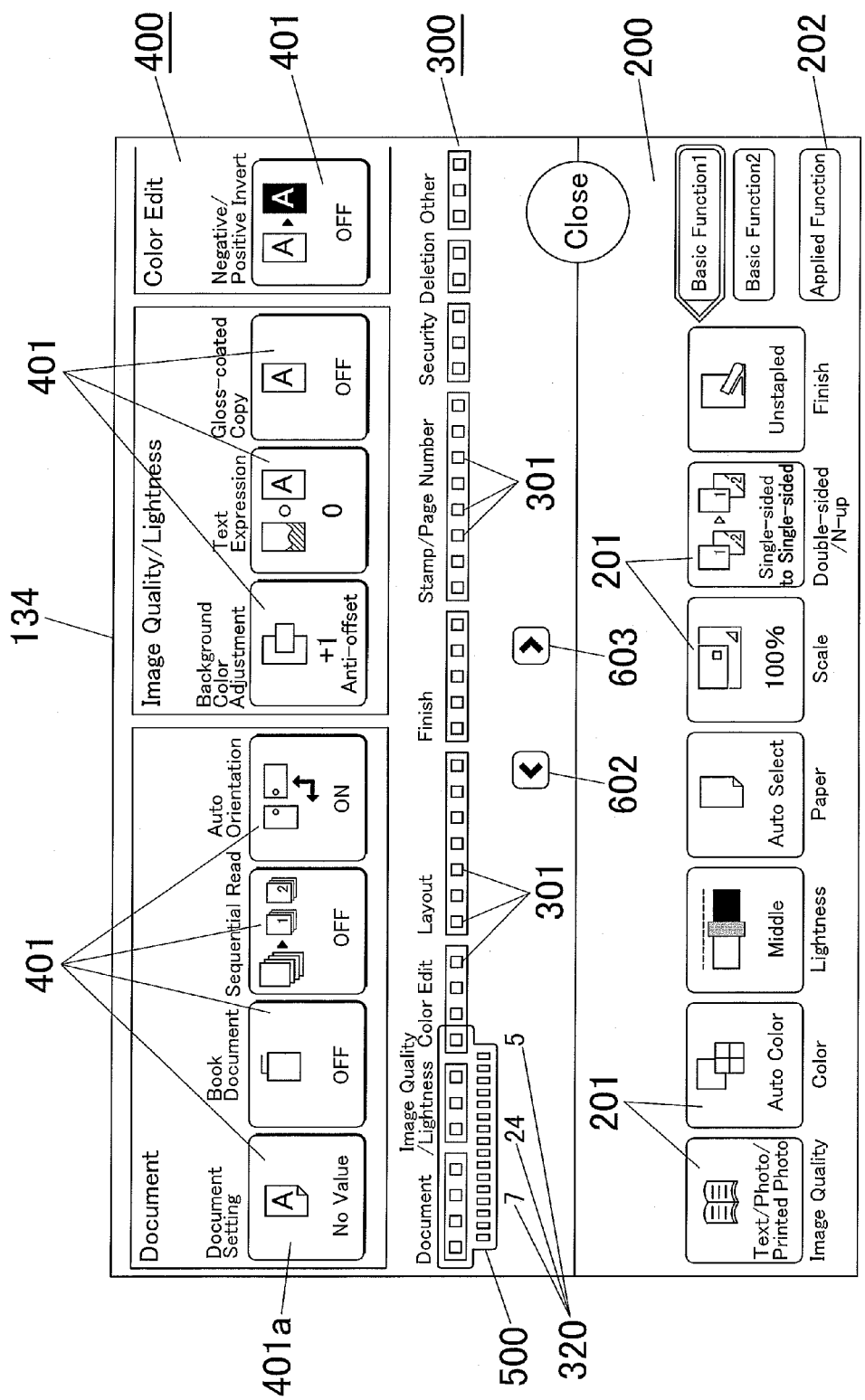
FIG. 13 relates to still yet another mode of implementing the present invention, and is a view illustrating a screen with the number of times every function was used.
Figure 14:
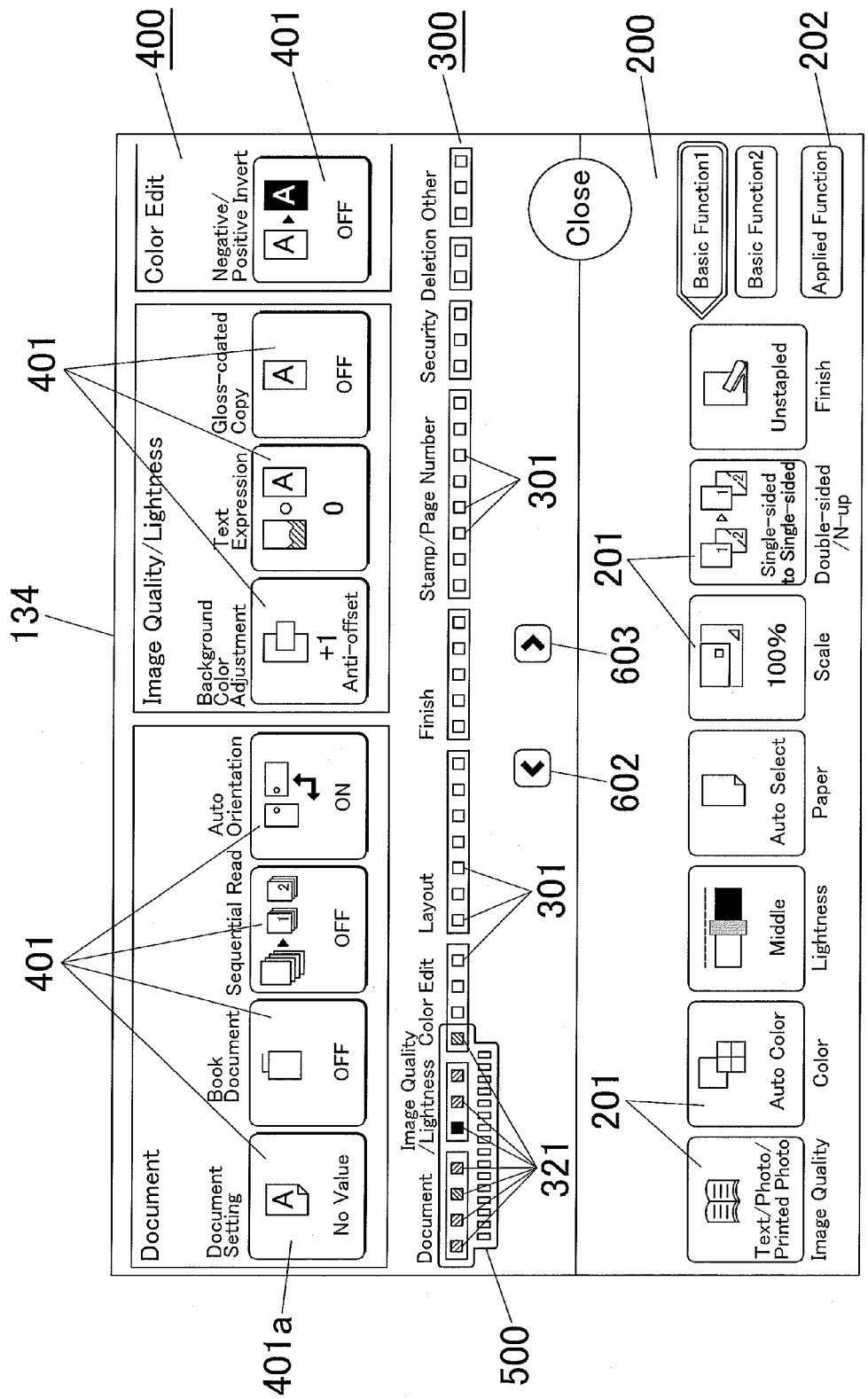
FIG. 14 is a view illustrating a screen with the counted numbers classified in some ranges.

FIGS. 13 and 14 relate to still yet another mode of implementing the present invention. In this mode of embodied implementation, the controller 100 of the image forming apparatus 1-x is configured so as to count the number of times every function was used. And the counted number (the number of times) is displayed as state information.

In the example of FIG. 13, a counted number 320, "7", is displayed under the icon corresponding to the "Sequential Read" button of the "Document" group. Also, a counted number 320, "24" in here, is displayed under the icon corresponding to the "Background Color Adjustment" button of the "Image Quality/Lightness" group, and a counter number 320, "5" in here, is displayed under the icon corresponding to the "Negative/Positive Invert" button of the "Color Edit" group.

On the other hand, in the example of FIG. 14, there are a plurality of functions represented by a plurality of icons that the cursor 500 points to, and the number of times every function was used is counted. And then, the counted numbers are classified for example in the following ranges: 0-4 times, 5-10 times, and over 10 times, and depending on the range, the icons are displayed in different colors, for example.

Therefore, users can easily know how frequently every function was used, via the screen illustrated in FIG. 13 or 14.

The number of times may be displayed: on an icon 301 or in the vicinity thereof; on a function button 401 or in the vicinity thereof; or in the basic setting display area 200 in the bottom part of the screen. The number of times may be how many times every function was used by all users. It may be how many times every function was used by every authorized user. It may be how many times every function was used by every department. An administrator or the like is also allowed to preliminarily determine which display method to employ, and also allowed to change it.

Furthermore, the controller 100 may automatically realign the function buttons 401 and the icons 301 in the horizontal direction of the screen, based on the counted numbers. For example, the function buttons 401 and the icons 301 of the more frequently used functions can be realigned in descending order starting from the left.

This realignment operation may be automatically performed by the controller 100, and also may be manually performed by a user. The function button 401 and the icons 301 may be manually realigned in order based on not only the counted numbers but also whether or not a bookmark is given.

The functions may be realigned in order within every function group, and also may be realigned in order all mixed together out of function groups.

Figure 15:
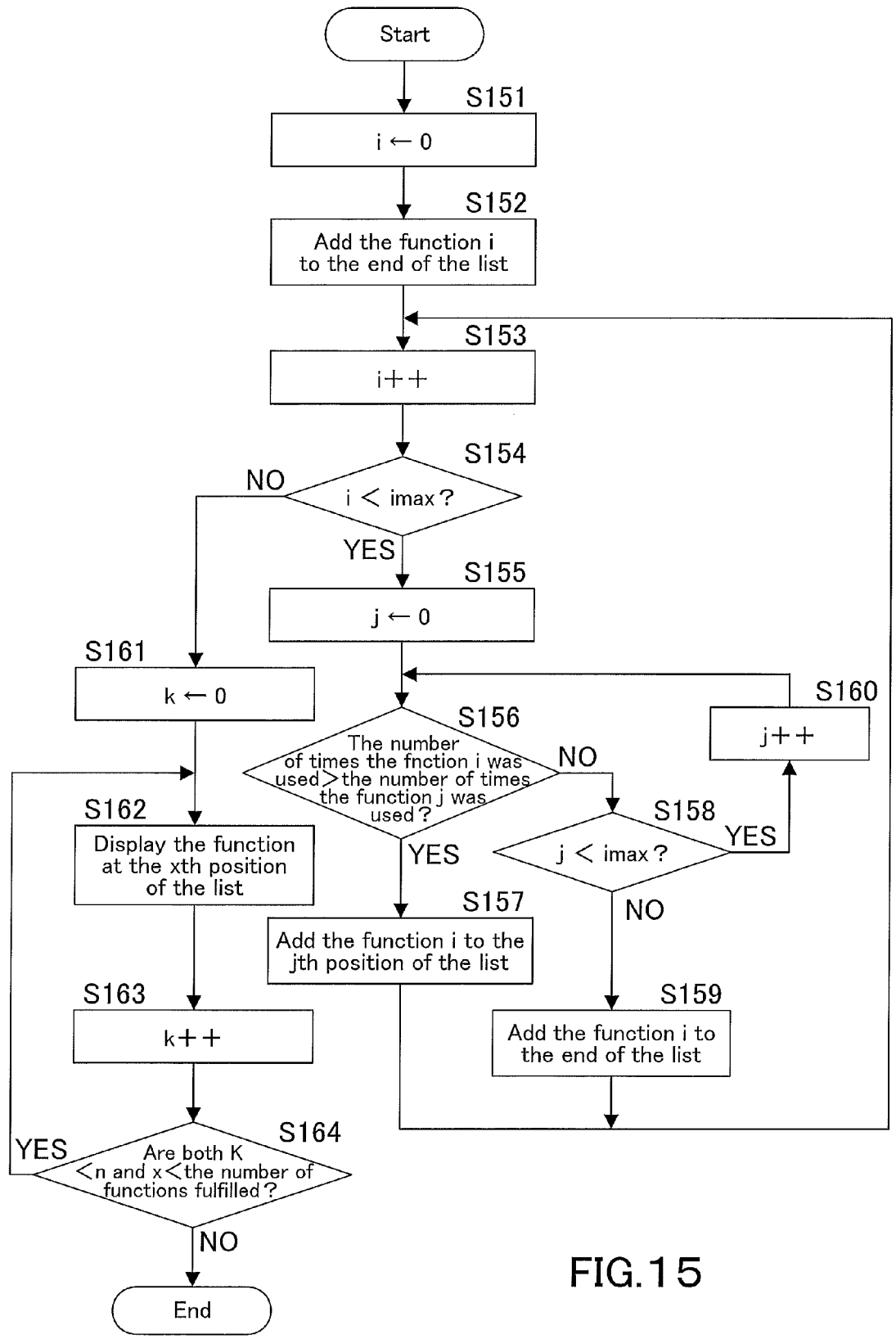
FIG. 15 is a flowchart representing a processing routine to realign all function buttons and icons in order based on the counted numbers, in the same mode of implementing the present invention.

FIG. 15 is a flowchart representing a processing routine to realign all the function buttons 401 and icons 301 in order based on the counted numbers. This processing routine is executed by the CPU 101 of the controller 100 according to an operation program stored on a recording medium such as the ROM.

The variable number i is set to 0 in Step S151, and a function i is added to the end of a function list in Step S152.

Subsequently, the variable number i is incremented in Step S153, and then it is judged in Step S154, whether or not the variable number i is smaller than the maximum value imax. If the variable number i is smaller than the maximum value imax (YES in Step S154), the variable number j is set to 0 in Step S155, and then it is judged in Step S156, whether or not the number of times the function i was used is larger than that a function j was used.

If the number of times the function i was used is larger than that the function j was used (YES in Step S156), the function i is added to the jth position of the function list in Step S157, and then the routine goes back to Step S153.

If the number of times the function i was used is not larger than that the function j was used (NO in Step S156), then it is judged in Step S158, whether or not the variable number j is smaller than the maximum value jmax. If the variable number j is smaller than the maximum value jmax (YES in Step S158), the variable number j is incremented in Step S160, and then the routine proceed to Step S156. If the variable number j is not smaller than the maximum value jmax (NO in Step S158), the function i is added to the end of the function list in Step S159, then the routine goes back to Step S153.

In Step S154, if the variable number i is not smaller than the maximum value imax (NO in Step S154), and the variable number k is set to 0 in Step S161.

Subsequently, the function at the xth position of the function list is displayed in Step S162. Here, if the symbol p represents the page number of a displayed page and the symbol n represents the number of functions (function buttons) displayed on one page, then x is calculated by the formula x=(p−1)×n+k.

Back to the routine, the variable number k is incremented in Step S163, and then it is judged in Step S164, whether or not the current state fulfills both k<n and x<the number of functions. If the current state fulfils both k<n and x<the number of functions (YES in Step S164), the routine goes back to Step S162. If the current state does not fulfill both k<n and x<the number of functions (NO in Step S164), the routine terminates.

The function buttons 401 and the icons 301 are displayed in the alignment order changed by the procedure.

Figure 16:
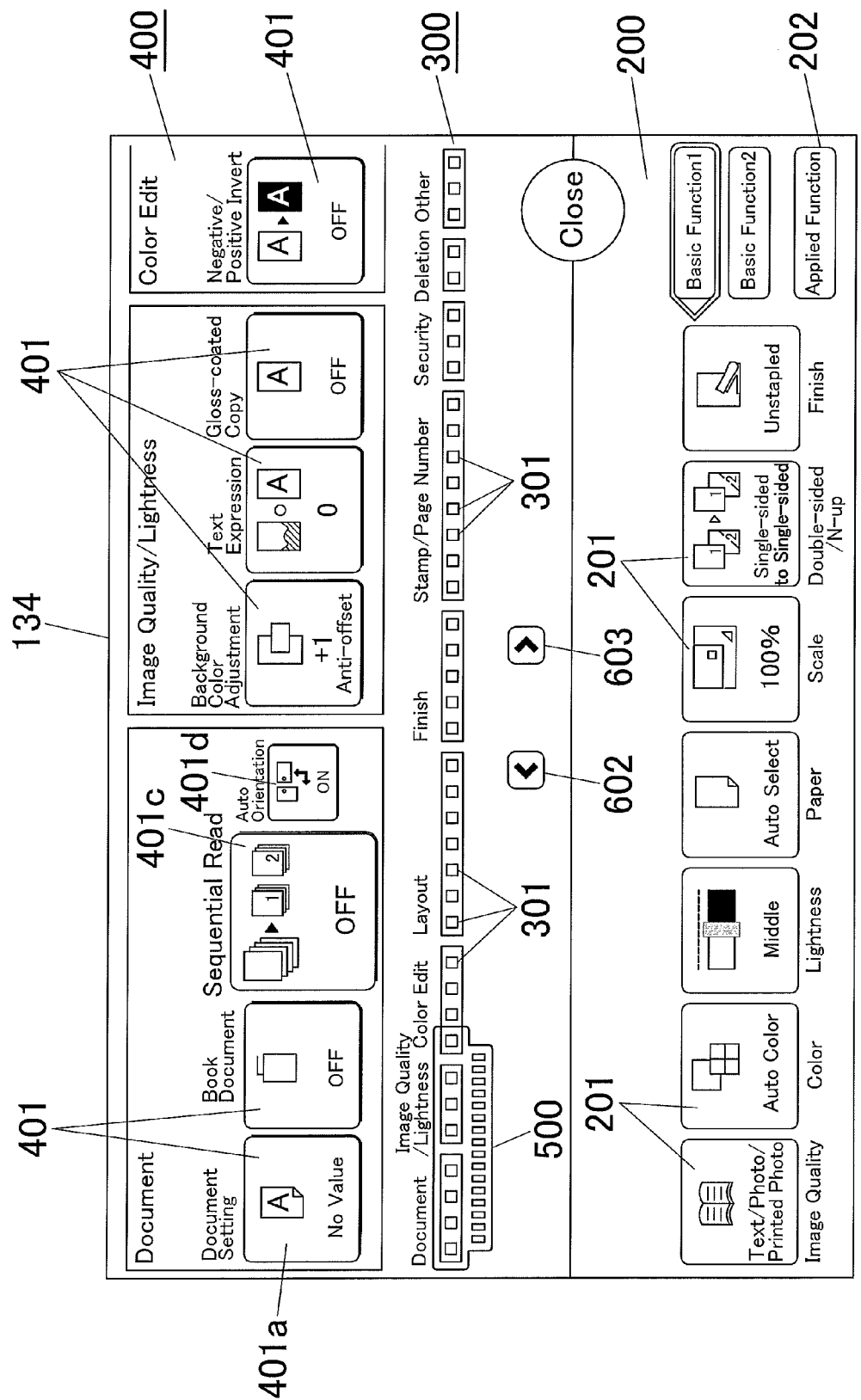
FIG. 16 relates to still yet another mode of implementing the present invention, and is a view illustrating a screen with a function button having been never used for a predetermined period of time, displayed in a smaller size than the other function buttons having been used at least one time for the same period of time.

FIG. 16 relates to still yet another mode of implementing the present invention. In this mode of embodied implementation, the number of times every function was used is counted by the controller 100, a function button 401d of a function having never been used for a predetermined period of time is displayed in a smaller size than the other function buttons 401 of the functions having been used at least one time for the same period of time. On the other hand, a function button 401c of a function having been most frequently used for the same period of time is displayed in a larger size than the other function buttons 401.

As described above, a function button 401 is displayed in a smaller or larger size than the other function buttons. And thus, users can easily find which function has never been used for a predetermined period of time, which function has been used at least one time for the same period of time, and which function has been most frequently used for the same period of time, which would improve user operability.

The function button 401d of a function having never been used for a predetermined period of time may be hidden instead.

Figure 17:
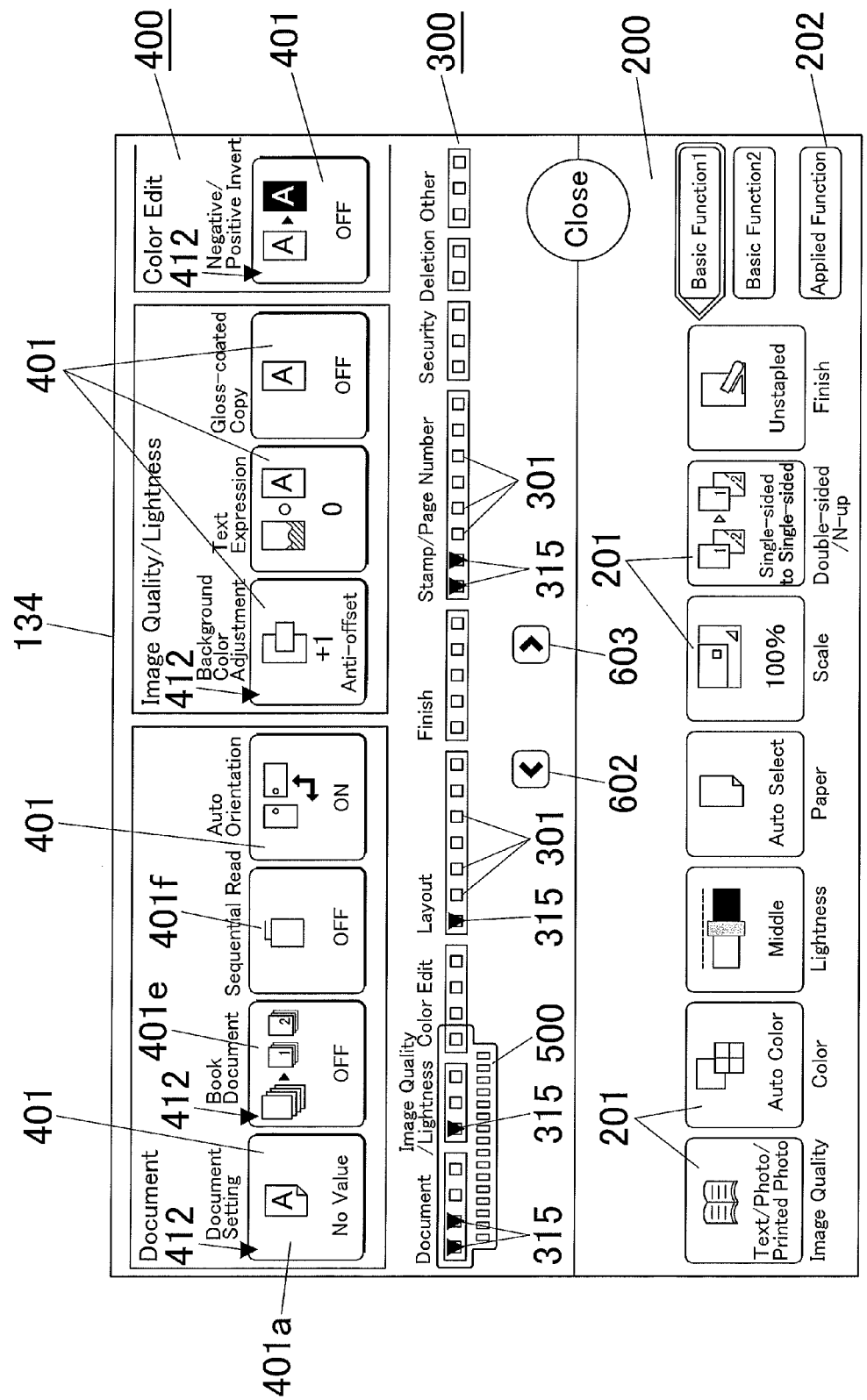
FIG. 17 relates to still yet another mode of implementing the present invention, and is a view illustrating a screen with function buttons and icons realigned in order based on whether or not a bookmark is given.

FIG. 17 relates to still yet another mode of implementing the present invention. In this mode of embodied implementation, function buttons and icons are realigned in order within every function group, based on whether or not a bookmark is given.

Specifically, as illustrated in FIG. 17, the alignment order within the "Document" group is now changed; the "Sequential Read" button 401e with the bookmark 412 is displayed to the immediate right hand of the "Document Setting" button 401a with the bookmark 412, and to the immediate left hand of the "Book Document" button 401f without the bookmark 412. Also, the icons 301 with the bookmark 315 are displayed to the left hand within the group.

By changing the alignment order as described above, users can easily find which functions hold a bookmark, which would improve user operability.

This alignment operation may be automatically performed by the controller 100, and also may be manually performed by a user.

Figure 18:
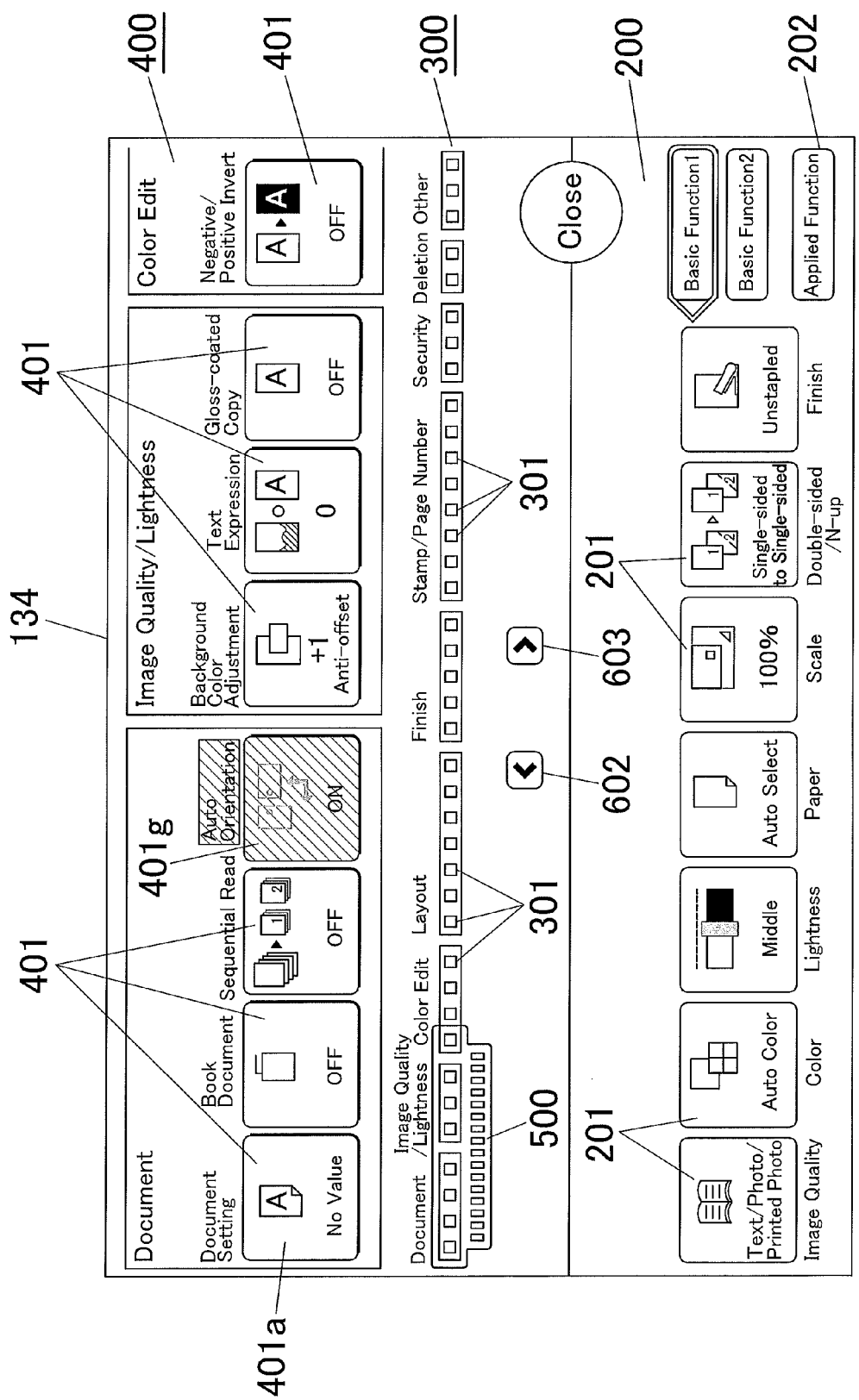
FIG. 18 is a view illustrating an example of a screen with a function button prohibited from changing its original position in the alignment order.
Figure 19:
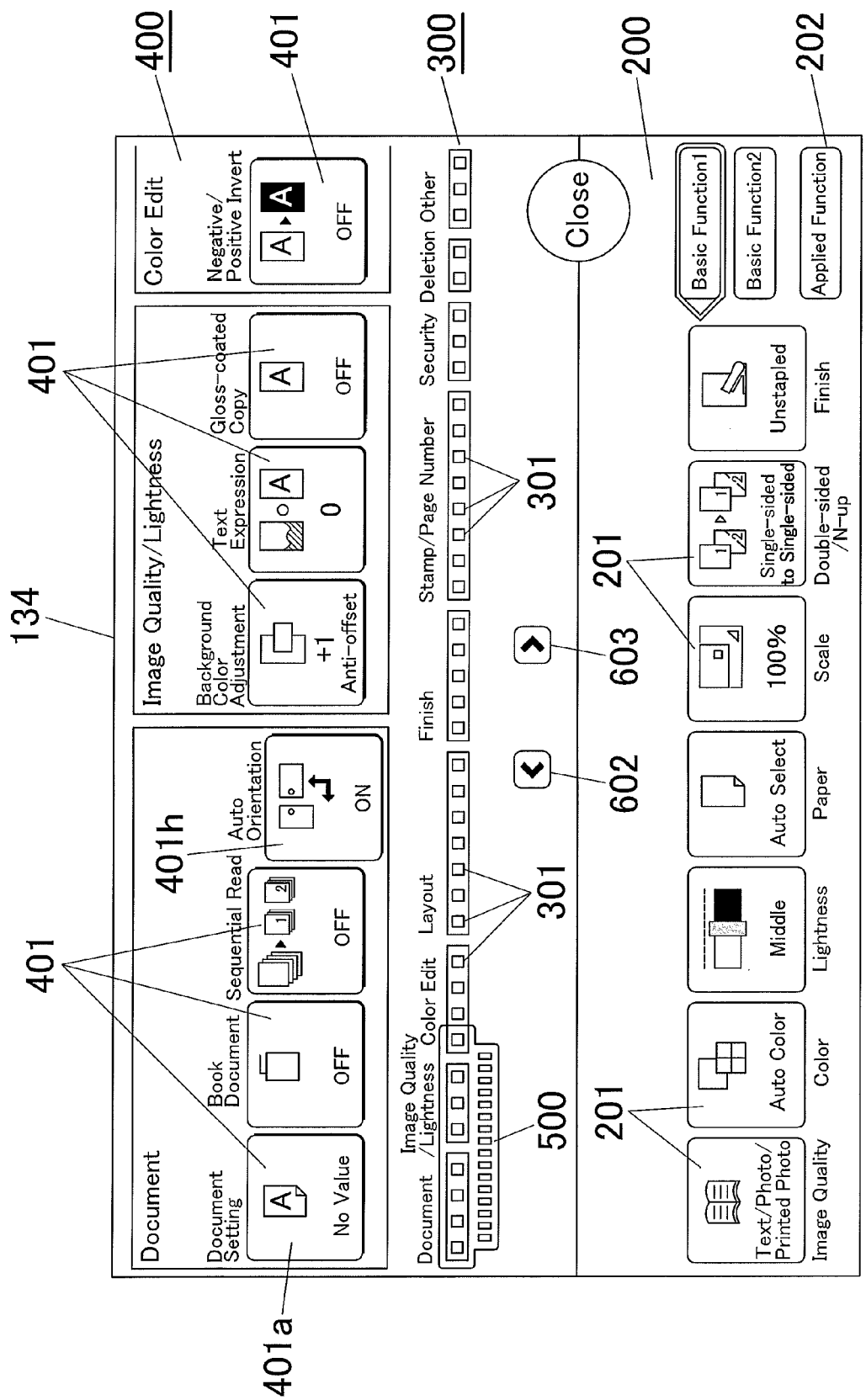
FIG. 19 is a view illustrating another example of a screen with a function button prohibited from changing its original position in the alignment order.

For example, if a person holding a superior authority, such as an administrator, prohibits a function button of a function such as the security function from changing its original position in the alignment order, the restricted function button may be grayed out (or displayed at a different darkness level) just like the function button 401g illustrated in FIG. 18, or alternatively, the restricted function button 401h may be moved under the original position as illustrated in FIG. 19.

As described above, if the restricted function buttons 401g and 401h are grayed out or moved from its original position. Therefore, users can easily know that the alignment order cannot be changed.

The modes of implementing the present invention have been described in the foregoing specification, which does not mean that the present invention shall be construed as limited to the particular forms disclosed.

For example, in these modes of embodied implementation described above, as many as eight function buttons 401 are displayed at the same time with use of the cursor 500. To have more or less function buttons 401 at the same time on the display, the length of the cursor 500 may be changed.

Specifically, when mention is made of an image processing apparatus with some functions restricted by an administrator, a monochrome image forming apparatus with less functions, or the like, a small number of function groups and function buttons 401 are displayed on the screen. And so, making the length of the cursor 500 larger would facilitate users to operate the cursor 500 and the function buttons 401.

The length of the cursor 500 may be arbitrarily determined by a general user or an administrator-level user. Alternatively, the image processing apparatus 1-x may count the number of function groups or function buttons 401, and automatically change the length of the cursor 500 based on the counted number. Specifically, the image processing apparatus 1-x may be configured such that the controller 100 implements the algorithm to change the length of the cursor 500 in inverse proportion to the number of function groups or function buttons 401.

As well as the length, the speed at which the pointer of the cursor 500 moves may be arbitrarily determined by each user. And so, users can obtain their preferred operating conditions individually, which would improve user operability.

Furthermore, if there is extra display space both above and under the cursor 500 in the plane view, the width (vertical length) of the cursor 500 may be broadened so as to facilitate users to operate.

Also, an area at a position that a user touches on the screen may be displayed in a larger size, or alternatively, it may be displayed both in a larger size and at a higher lightness (or the other area may be displayed at a lower lightness to make a difference), which is not illustrated in the Figures. And so, users can easily recognize the current operating state.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
    a display portion that is capable of:
        displaying in an icon display area, icons that correspond one to one with function buttons for calling out setting screens for setting functions installed on the image processing apparatus;
        displaying in a function button display area, function buttons that correspond one to one with some of the icons, which exist at a position that a user points to;
    a position identification portion that identifies the position that a user points to in the icon display area; and
    a display controller that makes the display portion to display:
        the icons in the icon display area, the icons being organized in groups by function attribute;
        the function buttons that correspond to the icons existing at the position identified by the position identification portion, in the function button display area, the function buttons being organized in groups by function attribute similar to the organization of the icons in the icon display area; and
        state information indicating the current state of at least one of the functions and/or attribute information indicating the current attribute of at least one of the functions, on/near a function button of the function and/or on/near an icon corresponding to this function button.

2. The image processing apparatus recited in claim 1, wherein the state information indicates whether or not a value set for the function has been changed.

3. The image processing apparatus recited in claim 1, wherein the state information indicates whether or not to allow the use of the function.

4. The image processing apparatus recited in claim 1, further comprising a bookmarker that gives a bookmark according to a user instruction, wherein the attribute information indicates a bookmark given to the function by the bookmarker.

5. The image processing apparatus recited in claim 1, further comprising a counter that counts the number of times every function was used, wherein the state information indicates the numbers counted by the counter.

6. The image processing apparatus recited in claim 5, wherein the display controller realigns the function buttons and the icons in order in their respective display areas, based on the numbers counted by the counter.

7. The image processing apparatus recited in claim 6, wherein the counter is capable of counting the number of times every function was used by every user, the number of times every function was used by every department, and the number of times every function was used by all users, and the display controller realigns the function buttons and the icons in order in their respective display areas, based on the respective counted numbers.

8. The image processing apparatus recited in claim 5, wherein the display controller displays a function button, which has not been used for a predetermined period of time, and another function button, which has been used at least one time during the predetermined period of time, in different forms from each other.

9. The image processing apparatus recited in claim 4, wherein the display controller realigns the function buttons and the icons in order in their respective display areas, based on whether or not a bookmark is given by the bookmarker.

10. The image processing apparatus recited in claim 4, wherein the display controller realigns the function buttons and the icons in order in their respective display areas, based on whether or not a bookmark is given by the bookmarker, according to a user instruction.

11. The image processing apparatus recited in claim 9, wherein the display controller displays a function button prohibited from changing its original position in the alignment order and the other function buttons in different forms from each other.

12. The image processing apparatus recited in claim 4, wherein the bookmarker adds the user's preferred identification symbol on a bookmark.

13. The image processing apparatus recited in claim 12, wherein the bookmarker automatically adds the identification symbol on the bookmark.

14. The image processing apparatus recited in claim 1, wherein the position identification portion simultaneously identifies more than one of the icons corresponding to the function buttons.

15. A non-transitory computer-readable recording medium having a display control program stored thereon to make a computer of an image processing apparatus execute:
    identifying a position that a user points to in an icon display area on a display portion that is capable of:

displaying in the icon display area, icons that correspond one to one with function buttons for calling out setting screens for setting functions installed on the image processing apparatus;

displaying in a function button display area, function buttons that correspond one to one with some of the icons, which exist at the identified position; and displaying:
- the icons in the icon display area, the icons being organized in groups by function attribute;
- the function buttons corresponding to the icons existing at the identified position, in the function button display area, the function buttons being organized in groups by function attribute similar to the organization of the icons in the icon display area; and
- state information indicating the current state of at least one of the functions and/or attribute information indicating the current attribute of at least one of the functions, on/near a function button of the function and/or on/near an icon corresponding to this function button.

16. A display control method for an image processing apparatus comprising:

identifying a position that a user points to in an icon display area on a display portion that is capable of:

displaying in the icon display area, icons that correspond one to one with function buttons for calling out setting screens for setting functions installed on the image processing apparatus;

being organized in groups by function attribute;

displaying in a function button display area, function buttons that correspond one to one with some of the icons, which exist at the identified position; and displaying:
- the icons in the icon display area, the icons being organized in groups by function attribute;
- the function buttons corresponding to the icons existing at the identified position, in the function button display area, the function buttons being organized in groups by function attribute similar to the organization of the icons in the icon display area; and
- state information indicating the current state of at least one of the functions and/or attribute information indicating the current attribute of at least one of the functions, on/near a function button of the function and/or on/near an icon corresponding to this function button.

17. The display control method recited in claim 16, wherein the identified portion simultaneously identifies more than one of the icons corresponding to the function buttons.

18. The image processing apparatus of claim 14, wherein the identified portion is configured to identify at least two icons corresponding to the function buttons when the at least two icons are arranged in different groups by function attribute.

19. The non-transitory computer-readable recording medium recited in claim 15, wherein the identified portion simultaneously identifies more than one of the icons corresponding to the function buttons.

* * * * *